United States Patent [19]

Fain

[11] Patent Number: 5,247,690
[45] Date of Patent: Sep. 21, 1993

[54] METHOD FOR DETECTING TRANSMITTING CONTROL CODE USING M OUR OF N DETECTION SCHEME FOR INITIATING A LATCHING LOOPBACK TEST PROCEDURE

[75] Inventor: Marc Fain, Saunderstown, R.I.

[73] Assignee: Alcatel Network Systems, Inc., Richardson, Tex.

[21] Appl. No.: 485,605

[22] Filed: Feb. 27, 1990

[51] Int. Cl.$^5$ .............................. H04J 1/16; H04J 3/14; H04M 1/24
[52] U.S. Cl. .................................... 395/800; 370/13; 370/15; 370/17; 379/5; 379/10; 364/514; 364/942.7; 364/DIG. 2
[58] Field of Search .................. 395/800; 379/5, 10, 379/26; 370/15, 13, 17; 364/514

[56] References Cited

U.S. PATENT DOCUMENTS

| | | | |
|---|---|---|---|
| 3,761,809 | 9/1973 | Lockitt et al. | 324/77 R |
| 4,523,325 | 6/1985 | Justus | 377/44 |
| 4,584,579 | 4/1986 | Frost et al. | 343/17.1 R |
| 4,899,159 | 2/1990 | Marchant | 342/90 |
| 5,010,544 | 4/1991 | Chang et al. | 370/13.1 |

Primary Examiner—Thomas C. Lee
Assistant Examiner—Alpesh M. Shah
Attorney, Agent, or Firm—Ware, Fressola, Van Der Sluys & Adolphson

[57] ABSTRACT

In a data port for a digital data system in which latching loopback is implemented, a unique and efficient algorithm is utilized to achieve M out of N control byte recognition. In the algorithm, N−M+1 variable length windows are used to count identified control bytes. The algorithm opens a window when the desired byte has been detected, counts the identified bytes while the window is open, and closes the window when a non-target byte is detected. The counts in the various windows are summed to determine if M bytes have been detected. A window having the oldest byte count is effectively dropped so that the window is available to count newly-arriving target bytes.

14 Claims, 14 Drawing Sheets

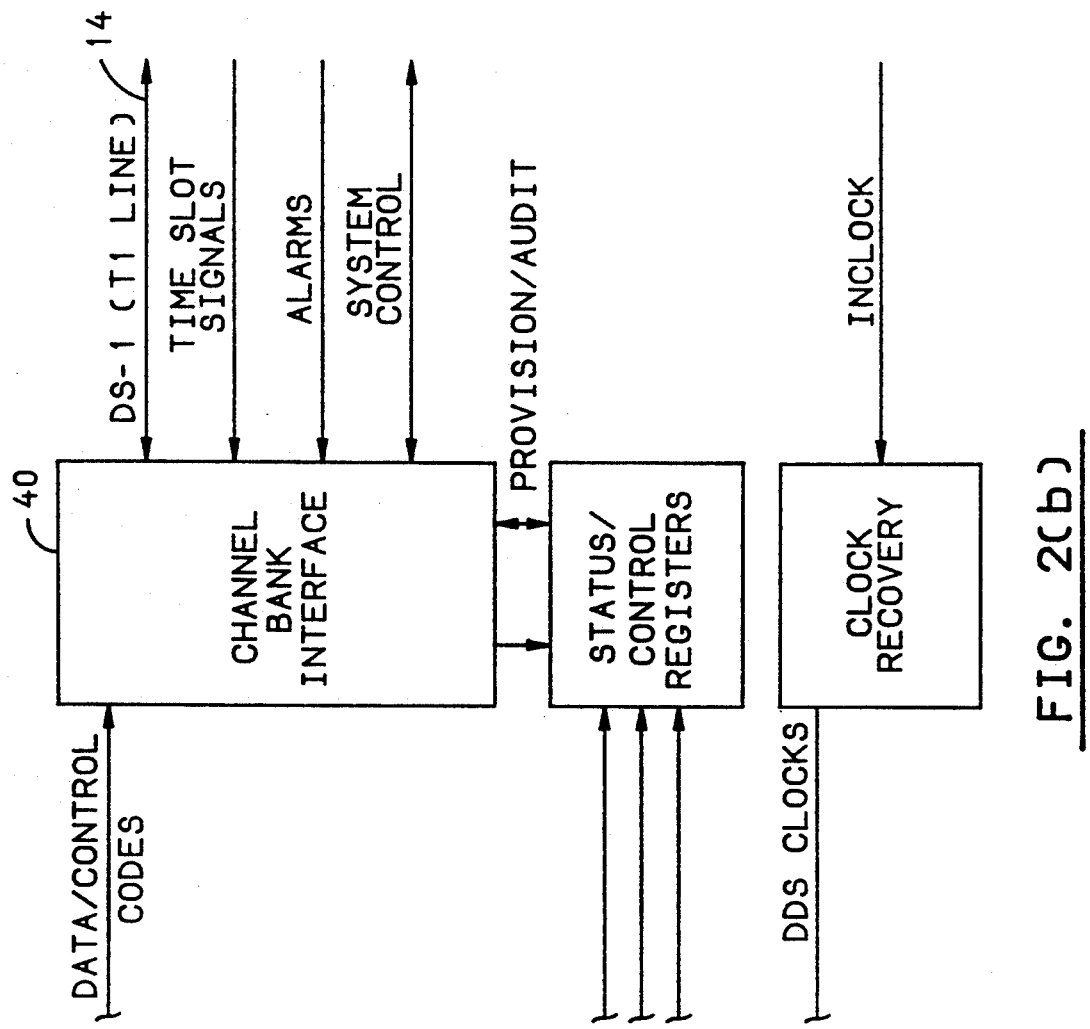

Latching loopback high level flowchart

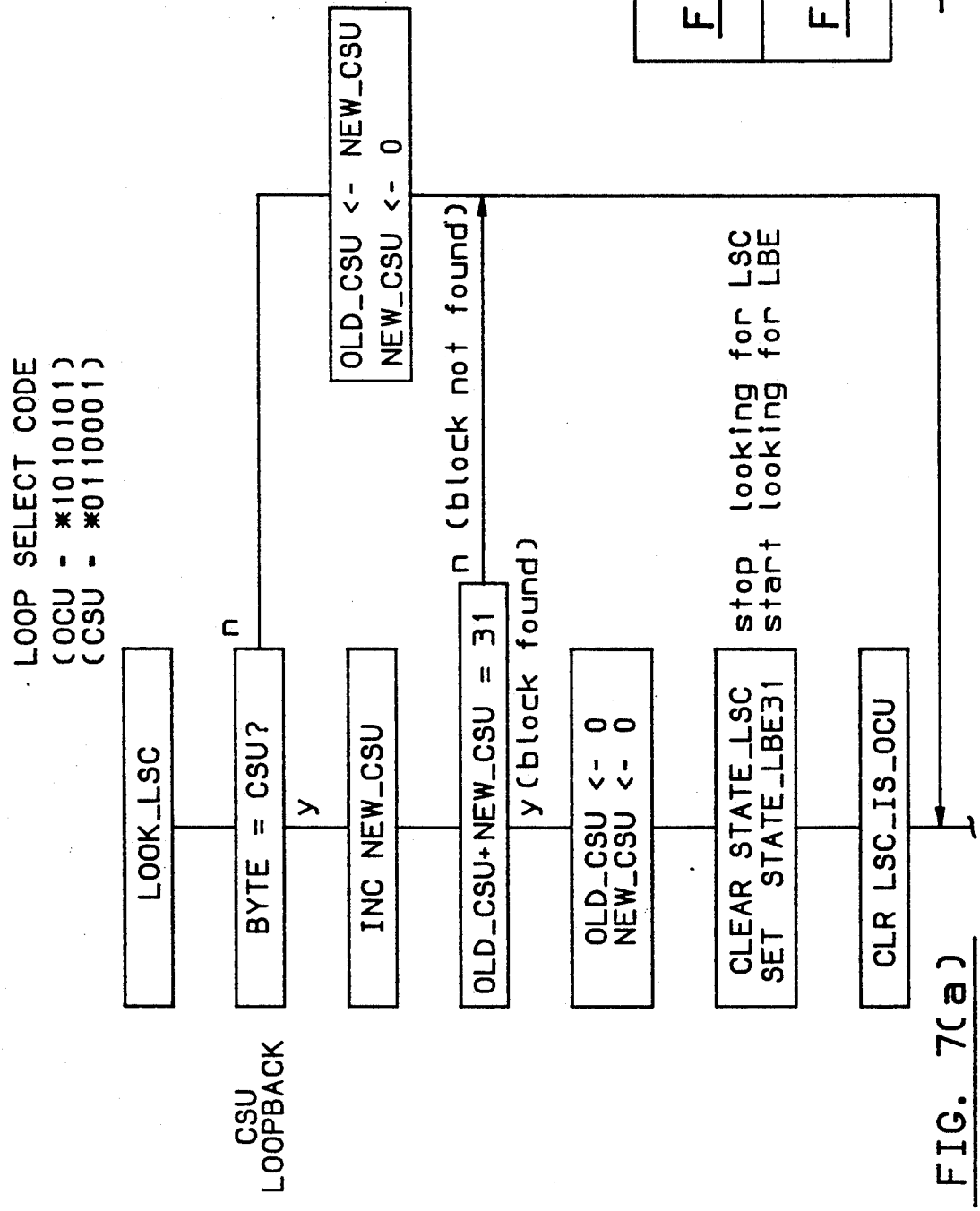

FAR END VOICE
(FEV = *1011010)

METHOD FOR DETECTING TRANSMITTING CONTROL CODE USING M OUR OF N DETECTION SCHEME FOR INITIATING A LATCHING LOOPBACK TEST PROCEDURE

BACKGROUND OF THE INVENTION

1. Field of the Invention

The present invention relates to dataports for digital data systems and, more particularly, to apparatus and methods for implementing a latching loopback test procedure in a digital data system.

2. Description of the Prior Art

Loopback procedures are commonly used for testing data transmission systems and, in particular, for isolating system faults. When loopbacks are used, data received at a predetermined location in the system is sent back to its origin, where it can be compared to the transmitted data to identify transmission errors. Loopback tests can be initiated at almost any point in a transmission system where test facilities may be located.

In order to initiate a loopback test, the test equipment must send out control signals which must be sensed prior to initiating the loopback. Due to the critical nature of a loopback and the potential difficulties that could arise in the event of an erroneous initiation of loopback, it is essential that the loopback only be initiated when wanted. Due to inherent error levels in data transmission systems, standards have been set so that loopback is only initiated if M out of N control bytes are accurately received from the test equipment.

Digital data services are provided by operating telephone companies on standard telephone transmission lines. The specifications for digital data service have been established by Bell Communications Research, Inc., and an overall description of the service may be found in "Digital Data System", The Bell System Technical Journal, May-June 1975, Vol. 54, No. 5. Data ports for implementing the digital data service are usually compatible with PCM channel banks, as set forth in PUB 43801, "Digital Channel Banks—Requirements and Objectives", November, 1982. The specifications for data port channel cards providing digital data service have been established by Bell Communications Research, Inc. and have been published as Technical Advisory TA-TSY-000077, Issue 3, entitled "Digital Channel Banks—Requirements for Data Port Channel Unit Functions".

The above-referenced technical advisory suggests an optional latching loopback feature, where the loopback is initiated by a series of control codes transmitted by test equipment, and the loopback is held until released by the transmission of a particular control code. The Technical Advisory suggests that the control code processing algorithm should take on an "M out of N" form, where M is very close in value to N, such as 31 out of 32, 62 out of 64, and 8 out of 10 bytes being sensed as the desired control byte.

M out of N detection schemes are not new, and may be implemented in many different ways. A first example of a prior art M out of N detection system uses an N byte First-In/First-Out (FIFO) stack and performs N comparisons each time a new byte is entered into the FIFO. As data is shifted through the FIFO, the number of bytes currently stored in the FIFO that are identical to a target byte are counted. If the number of proper comparisons equals M, the M out of N criteria has been established.

In another form of M out of N detection, an N byte FIFO is also used in conjunction with a counter. The process requires two comparisons per FIFO entry. As data is shifted through the FIFO, the counter is incremented if the byte entering the FIFO is the desired target byte, while the counter is decremented if the byte exiting the FIFO is the target byte. When the running count reaches M, the required M out of N target bytes have been identified.

The above methods of M out of N detection require an N byte-sized FIFO, plus FIFO management software and storage. This imposes rigorous requirements on the system which is searching for the M out of N criteria. Due to the large number of comparisons required, the system needs a relatively fast processor, large RAM storage, and a significant amount of program memory for FIFO management. The time required to execute the afore-mentioned methods will depend upon the particular system executing the algorithm; but in general, both methods will require additional time for FIFO management and for the large number of comparisons that must be made.

The RAM storage requirements for the above-mentioned methods will include N bytes for FIFO storage, and storage space for the running count. The storage required for program memory will depend upon the particular language and system executing the algorithm; however, both methods will require program memory storage for FIFO management.

Thus, the prior art methods of determining M out of N are rather simple in concept but require considerable storage capacity and the use of fast microprocessors to handle the large number of comparisons that must be executed.

SUMMARY OF THE INVENTION

The present invention contemplates an algorithm for detecting M out of N target data bytes, which algorithm is particularly adaptable for use in implementing a latching loopback procedure in a digital data service system. In implementing the algorithm, $N-M+1$ variable length windows are used for counting target bytes, rather than the usual fixed-length FIFO storage. The algorithm opens a window when a target byte has been detected and closes the window when a non-target byte is detected. Thus, the algorithm effectively counts the number of target bytes between non-target bytes.

The summation performed by the algorithm to determine if M out of N detection has been achieved may be expressed as follows:

$$\text{IF } \sum_{x=1}^{x=N-M+1} Z(x) \text{ is greater than or equal to } M$$

THEN M out of N detection has been achieved.
Where:
M = number of target bytes
N = block size
Z = window size of window (x)
$Z(1)$ = size of oldest window
$Z(N-M+1)$ = size of newest window Each time a non-target byte is detected, the count in the newest window is set to zero, the window count is shifted into the next oldest window, and the count in the oldest window is lost.

Using the variable-length window algorithm in a data port for implementing latching loopback, the various control codes transmitted by the test equipment, as set forth in TA-TSY-000077, may be detected with certainty so that latching loopback will not be erroneously implemented.

The variable-length window algorithm makes real-time M out of N detection practical for inexpensive microprocessors, due to the algorithm efficiencies which require less execution time, less RAM and less program memory. Compared to the afore-mentioned prior art techniques, the variable-length window algorithm requires only one byte comparison for each new byte received, as opposed to two comparisons for one technique, and N comparisons for the other technique. In regard to RAM storage requirements, the prior art techniques both require N bytes storage for FIFO and one for maintaining a running count. Using the variable-length window algorithm, the present invention, requires only $N-M+1$ bytes for storing window size history. In the area of program memory, the amount of such memory required depends upon the particular language and system executing the code. However, in general, the variable-length window algorithm requires less code, when implemented in firmware, and fewer logic gates, if implemented in hardware. This results from the fact that fewer comparisons need to be done using the variable-length window algorithm, and no FIFO management is required.

A primary objective of the present invention is to provide an inexpensive way of detecting M out of N target bytes.

Another objective of the present invention is to provide a method for M out of N detection which may be practiced on an inexpensive microprocessor.

Another objective of the present invention is to provide a method for M out of N detection which requires less execution time than prior art methods.

Another objective of the present invention is to provide an M out of N detection system having smaller memory requirements than the prior art systems.

Another objective of the present invention is to provide an M out of N detection apparatus and method that may be practically used in a digital data system data port.

DETAILED DESCRIPTION OF THE PREFERRED EMBODIMENT

Figure 1:
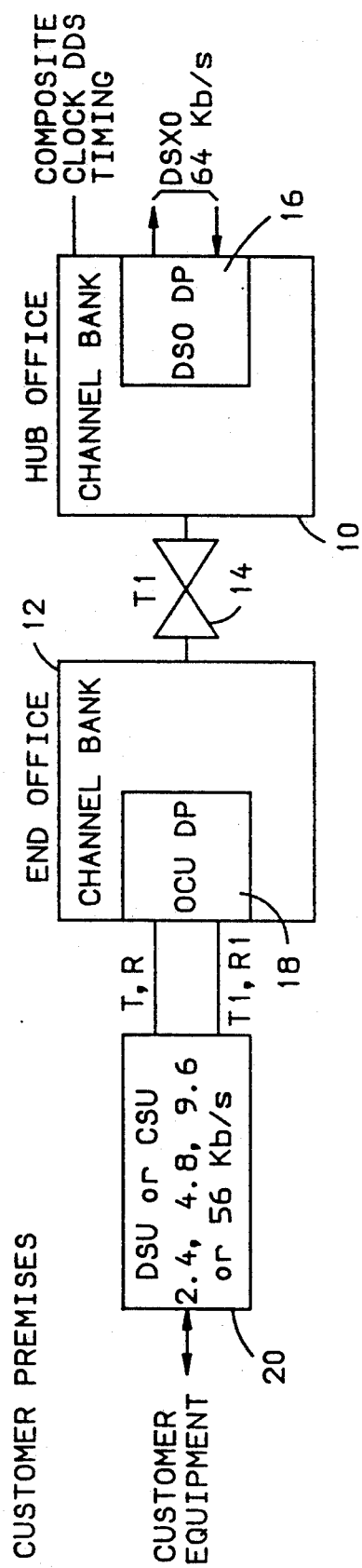
FIG. 1 is a block diagram of a system providing digital data capability.

Referring to FIG. 1, there is shown a system for providing digital data service, wherein channel banks are provided in a hub office 10 and an end office 12, said offices being connected via a T-carrier 14 operating at 1.544 Mb/s. The hub office 10 has a DS-0 data port 16 for interfacing with a DSX-0 cross-connect to a distant digital data service hub office. The end office 12 includes an OCU data port 18 which interfaces with a customer-provided four-wire base band bipolar return-to-zero digital signal. The digital signal is provided from a customer service unit (CSU) 20. The digital signals from the CSU may be any one of the standard digital data service data speeds of 2.4, 4.8, 9.6 and 56 Kb/s. The data speeds of 2.4, 4.8 and 9.6 Kb/s are commonly referred to as "sub-rates". One standard 64 Kb/s or DS-0, DS-1 channel time slot is used for the transmission of customer data signals at any of the digital data service standard rates. However, in the case of the 56 Kb/s rate, a second DS-0 channel may be needed for error correction.

The data port 18 contained within the end office 12 terminates the customer's four-wire local loop and provides the interface between the base band bipolar return-to-zero local loop signal and the DS-0 channel of the DS-1 facility in each direction. The data port 16 in the hub office 10 interfaces between the DS-0 channel of the DS-1 facility and the standard DS-0 signal to and from the DSX-0 cross-connect.

In general, the data ports must provide the following functions:

1. Perform the format and rate conversions, including error correction and zero code suppression, between the customer's local loop signal and the DDS service rates and the 64 Kb/s DS-0 channel and the DS-1 facility.
2. Recognize valid local loop and network control codes and take appropriate actions.
3. Provide for the interface between the DS-0 channel and the DS-1 facility and the DS-0 signal to and from the DSX-0 cross-connect.
4. Provide for error correction on the DS-0 channel incoming from the DS-1 facility.
5. Detect an "all zeroes" DS-0 byte and substitute the zero suppression code in the outgoing DS-1 bit stream.

The present invention is particularly directed towards function 2 mentioned above, that being the recognition of valid local loop and network control codes and, more particularly, towards the recognition of valid control codes for implementing latching loopback.

The general PCM line format for DS-1 operation consists of 24 8-bit words and one framing bit, for a total of 193 bits per frame. For most conventional voice-frequency channel units, the eighth bit of each word of the 64 Kb/s DS-0 channel is used for PCM coding five frames out of 6 and for signaling every sixth frame. This system is commonly known as robbed-bit signaling. This robbed bit signaling feature must be disabled for data port equipment channels to allow transmission of the DDS DS-0 signal.

The DS-0 data port channel is organized in an 8-bit byte structure. The bits are identified as bits $b_1$ through $b_8$, where $b_1$ is the first bit transmitted. To achieve the 64 Kb/s DS-0 for the 56 Kb/s customer data rate, the data port channel unit must insert a control bit after each block of seven customer data bits. Thus bits $b_1$ through $b_7$ are used to transmit the customer data signal, while bit $b_8$ is reserved for network control. Bit $b_8$ is set to a logical "1" by the data port channel unit whenever the customer's terminal is transmitting normal data.

For sub-rate formats, the data port channel unit must first encode the incoming data signals into an 8-bit byte format. The six bit positions $b_2$ through $b_7$ are used to transmit the customer's data signal, while bit position $b_1$ is assigned a logical "1" and bit position $b_8$ is reserved for network control and is set to logical "1" by the data port unit whenever customer data is transmitted. To achieve the 64 Kb/s DS-0 rate, the 8-bit sub-rate byte is repeated N times, where N is rate dependent and equals 5, 10 and 20 for the 9.6, 4.8 and 2.4 Kb/s digital data service rates, respectively.

Since the 8-bit bytes are repeated numerous times, the data port channel may perform error correction based on a majority-voting scheme using the repeated bytes. For the 56 Kb/s service, when the error correction option is chosen, decoding consists of finding the 16-bit code word (data plus parity bytes) which has the smallest Hamming distance from the actual 16-bit word received.

The digital data system network maintenance is accomplished via control codes that are propagated in the digital data system bit stream. These control codes can be used to indicate the status of individual DS-0 channels or for trouble sectionalization tests on a customer's DS-0 channel, such as using loopback techniques. Depending upon the type, the control codes can flow in the network-to-customer direction in the form of DS-0 bytes where bit $b_8$ of the byte is set to "0", and in the customer-to-network direction.

The data port channel unit must initiate the action required by the control code when it detects the appropriate number of consecutive network control code bytes error free. In most conditions, the data port will continue to maintain the test condition as long as the control bytes continue to be received. After the control bytes cease, the control condition is released, and normal operation proceeds.

The TA-TSY-000077 indicates that it is very desirable for digital data systems maintenance procedures to provide a latching loopback feature for fault isolation. The loopback desirably should be implemented at points where the customer's signal appears, as well as at DS-0 signal points. The desired loopback is considered to be "latching", in that once the loopback has been operated by detecting the correct code sequences, the loopback condition will remain operative until the correct loopback release code sequence has been detected.

The present invention is implemented in a data port as shown at 18 in FIG. 1, so as to facilitate a latching loopback either at the output of the data port toward the customer premises, or within the CSU on the customer premises. The Technical Advisory, TA-TSY-000055, "Basic Testing Functions for Digital Networks and Services", DRAFT, Bell Communications Research, Inc., specifies the sequence of control codes that a test center must send to effect the latching loopback. In the control codes, the first bit is identified as an "S", which is a "don't care" bit for control code purposes. The following sequence of control codes is provided to effect a latching loopback:

1. 30–35 Transition in Progress (TIP) bytes (S0111010);
2. 35–40 Loop Select Code (LSC) bytes (SDDDDDD1), where DDDDDD is a six-bit code identifying the kind of device in which the loopback feature resides;
3. 100–120 Loop Enable (LBE) bytes (S1010110);
4. 35–40 all-one bytes (S1111111) plus 100–120 LBE bytes; and
5. a minimum of 32 Far End Voice (FEV) bytes (S1011010).

To remove the loopback, the test center will transmit 35–40 TIP bytes.

The latching loopback initiating procedure contemplates first the recognition of TIP bytes which must be used to clear any prior loopback or intermediate states existing in the particular channel. Next, the LSC data bytes corresponding the particular loopback desired must be recognized by the appropriate data port channel unit. After receiving more than 30 LSC bytes correctly, recognition of further states in the loopback sequence may take place. If a proper LSC for a given type of data port channel unit is not received by the channel unit, it must remain in its normal transmission state.

When the LBE bytes are recognized, they should be processed in two steps. First, after more than 30 LBE bytes have been received at a channel unit that had previously recognized its proper LSC, that channel unit must map the remaining LBE bytes into either a MAP-0 or MAP-1 code, depending on the type of data port channel unit and loopback involved and insert the MAP-0 or MAP-1 into the data stream. The channel unit should recognize the remaining LBE bytes and if properly recognized, the channel unit should be enabled for recognition of the the FEV bytes. When the FEV bytes are detected, the actual loopback condition must be initiated, and the channel unit must remain in this state until the test center sends TIP bytes to clear the loopback condition.

While in the loopback state, the data port channel unit must monitor incoming LBE bytes from the test center and must map these LBE bytes into MAP-0 or MAP-1 bytes, as required, so that the test center can use the returned MAP bytes to verify that the loopback occurred at the proper location.

The mapping process should not start until more than 30 LBE bytes have been received by the channel unit and should stop when LBE bytes are no longer correctly received for 0.375 to 0.625 ms. The channel unit must maintain the loopback condition before, during and after the mapping process, and should return to a normal transmission state only when more than 30 TIP bytes have been received.

The Bell Communications Research, Inc. Technical Advisory does not set forth specific loopback code detection algorithms. However, the specification does indicate that the implemented detection/release latching loopback algorithm should function properly in the presence of $10^{-3}$ bit error rate when requested and should remain unoperated when not requested in the presence of $10^{-3}$ bit error rate. This is accomplished using an M out of N detection algorithm, where the value of M is very close to the value of N, as for example, 31 out of 32 TIP bytes, 62 out of 64 LBE bytes and 8 out of 10 FEV bytes.

The present invention provides an office channel unit data port using the variable length window algorithm for M out of N detection to implement a latching loopback feature.

Figure 2A:
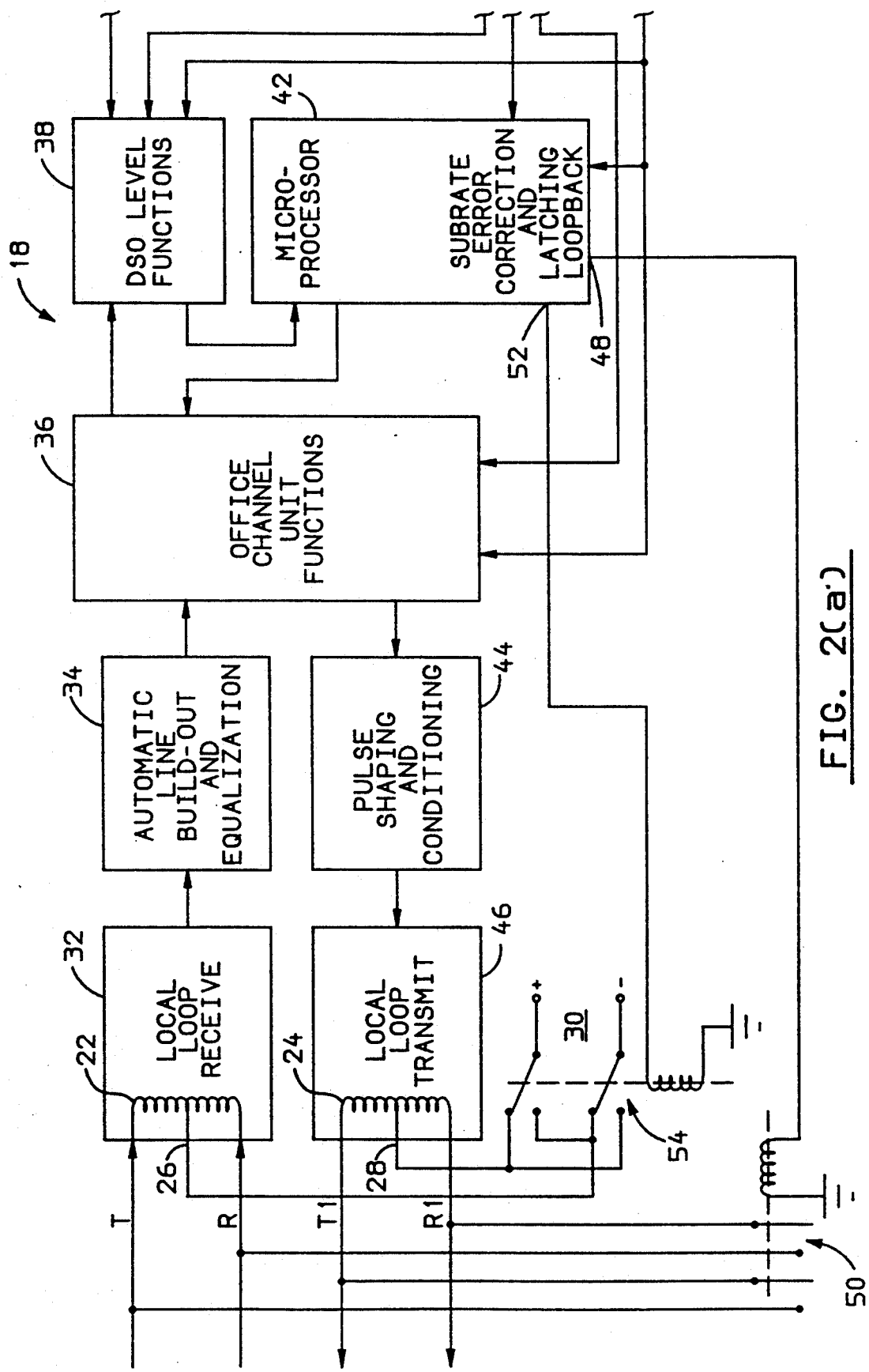
FIG. 2 shows the relation between FIGS. 2(a) and 2(b) which together show a block diagram of a data port which may be used to provide digital data service.

Referring to FIGS. 2(a) and 2(b) which are related as shown in FIG. 2, there is shown a data port in which the variable length window algorithm can be implemented. The OCU data port 18 shown in FIG. 2(a) and 2(b) converts the DDS bytes in bursts of 8 bits at a DS-1, 1.544 Mb/s rate to and from a continuous 2.4, 4.8, 9.6 or 56 Kb/s customer data rate. The data port is transformer coupled to the four-wire CSU, as illustrated by the coils representing one side of the transformers 22 and 24, which are connected respectively to the T and R lines and the T1 and R1 lines of the four-wire facility. Transformers 22 and 24 are center tapped at 26 and 28 respectively, with a battery voltage being applied thereto from a supply 30 for establishing a sealing current in the customer loop.

A local loop receive circuit 32 filters the received analog signal and provides it to circuit 34 which provides automatic line build-out and equalization. The automatic line build-out circuit determines the attenuation setting required to match the line level, while signal equalization is used to reconstruct the required digital signal level, which is then converted from bipolar to unipolar format.

An office channel unit functions circuit 36 provides channel unit functions in which the local loop data is translated from the customer data rate to a DS-0 64 Kb/s rate. In addition, the local loop control codes are detected and translated to the appropriate DDS format in the circuit 36. A DS-0 level functions circuit 38 provides parity byte generation if an error correction option is selected, and the customer rate is 56 Kb/s. The parity byte is sent with the data, and two DS-0 timeslots or channels are required to insure that the last data bit is always followed by the first parity bit, with no delays between transmission of consecutive bytes. The data and control codes are then directed towards a channel bank interface 40, which routes the digital signal to the proper Digroup Interface Unit, where the data is multiplexed and fed to the T1 carrier 14.

Serial PCM data enters the data port from the T1 carrier 14 by first passing through a Line Interface Unit common card in the channel bank 12, which functions to interface and extract the data from the DS-1 data stream received from the T1 carrier 14.

If error correction and the 56 Kb/s data rate options are selected, Bose-Chadhuri-Hocquenhem (BCH) error correction code is used to detect and correct errors. If error correction is disabled or the data port is processing sub-rate data, the 56 Kb/s error correction circuitry is bypassed. The error correction circuitry is located in DS-0 level functions circuit 38. Circuit 38 then converts the data to the DS-0 level and passes the data through a buffer which senses when there is an attempt to use data which is in the process of being updated and takes corrective action to guarantee valid data in the following frame.

The data then passes through a microprocessor 42, where the data is processed to perform sub-rate error correction and to detect and initiate latching loopback, among other procedures.

The data is then provided from the microprocessor 42 to the office channel unit functions circuit 36, where the DS-0 data is translated from the 64 Kb/s rate to the customer data rate, and the DDS control codes are detected and translated to the appropriate customer format. The digital signal is then conditioned for transmission over the metallic four-wire facility by the pulse shaping and conditioning circuit 44 and the local loop transmit circuit 46.

When the microprocessor 42 detects a latching loopback control code sequence for implementing office channel unit (OCU) loopback, an output is provided at microprocessor output 48, which output is used to continuously energize a relay 50, which is a double pole, single throw relay. Relay 50 is shown in the non-actuated state in FIG. 2. In the actuated state, the relay closes two switches to connect lines T to T1 and R to R1 of the four-wire metallic facility to thereby effect a loopback of the transmitted signal on T1 to line T and the signal on R1 to line R.

In a similar manner, when loopback is desired at the customer service unit (CSU), the microprocessor provides a signal at an output 52, which signal is used to drive a relay 54. Relay 54 is a double pole, double throw relay connected between the voltage source 30 and the center taps 26 and 28 of the transformers 22 and 24. The activation of relay 54 reverses the sealing current provided to the customer, which in effect signals the customer service unit to effect a loopback at the CSU.

The microprocessor 42 is programmed to implement the variable length window algorithm for detecting the required M out of N bytes of the various control codes used in the latching loopback control sequence. For detecting the TIP, the LSC, the first step of the LBE bytes, the algorithm implements a 31 out of 32 byte detection, and for the second step of the LBE detection implements a 62 out of 64 byte detection.

The pseudo code for implementing the variable length window algorithm for M out of N detection is as follows:

```
LOOP:   GET BYTE
        IF TARGET THEN DO
            Z(N−M+1) ← Z(n−m+1) + 1
            IF  x=N−M+1
                  Σ     Z(x) = M, THEN GOTO
                x=1                BLOCK-FOUND
        ELSE DO
            Z(1) ← Z(2)
                .
                .
            Z(N−M) ← Z (N−M+1)
            Z(N−M+1) ← 0
        END DO
        END IF
        GOTO LOOP:
BLOCK-FOUND:
        Z(1) ← 0
            .
            .
        Z(N−M) ← 0
        Z(N−M+1) ← 0
        process target block
    Where:  M = number of target bytes
            N = block size
            Z = size of window (x)
```

-continued

Z(1) = size of oldest window
Z(N−M+1) = size of newest window

The program listing for the code necessary to implement the latching loopback function in the office channel unit data port is found hereinafter, which code is provided in assembler language using an Archimedes 8051 assembler. The implementation of the code shown in Annex 1 may best be described with reference to FIGS. 5-10, which are flow charts for illustrating the steps of the code, and with reference to FIG. 11, which is a state diagram showing the implementation of the code.

Figure 4:
FIG. 4 is a flow chart showing the data byte processing of the data port of FIG. 2.
Figure 3:
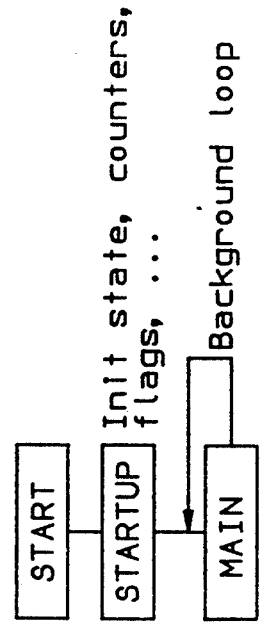
FIG. 3 is a flow chart showing the initiation steps used to power up a data port as shown in FIG. 2.

FIG. 3 merely illustrates the power-up procedure, which includes a start step, startup during which initiation procedures are undertaken and various states, counters and flags are reset and initialized, after which the main code of the microprocessor is continuously cycled. Each time a new byte is received at 125 usec intervals, the microprocessor is interrupted, and a procedure as set forth in FIG. 4 is initiated. Upon an interrupt by the receipt of a new byte, a previous byte is sent from the microprocessor to the office channel unit function circuit 36, which byte may be either a data byte or a MAP byte. After the old byte is sent to circuit 36, a new byte is received from the DS-0 level functions circuit 38. After the latching loopback procedure is complete, the microprocessor is returned to its main function, as shown in FIG. 3.

Figure 5A:
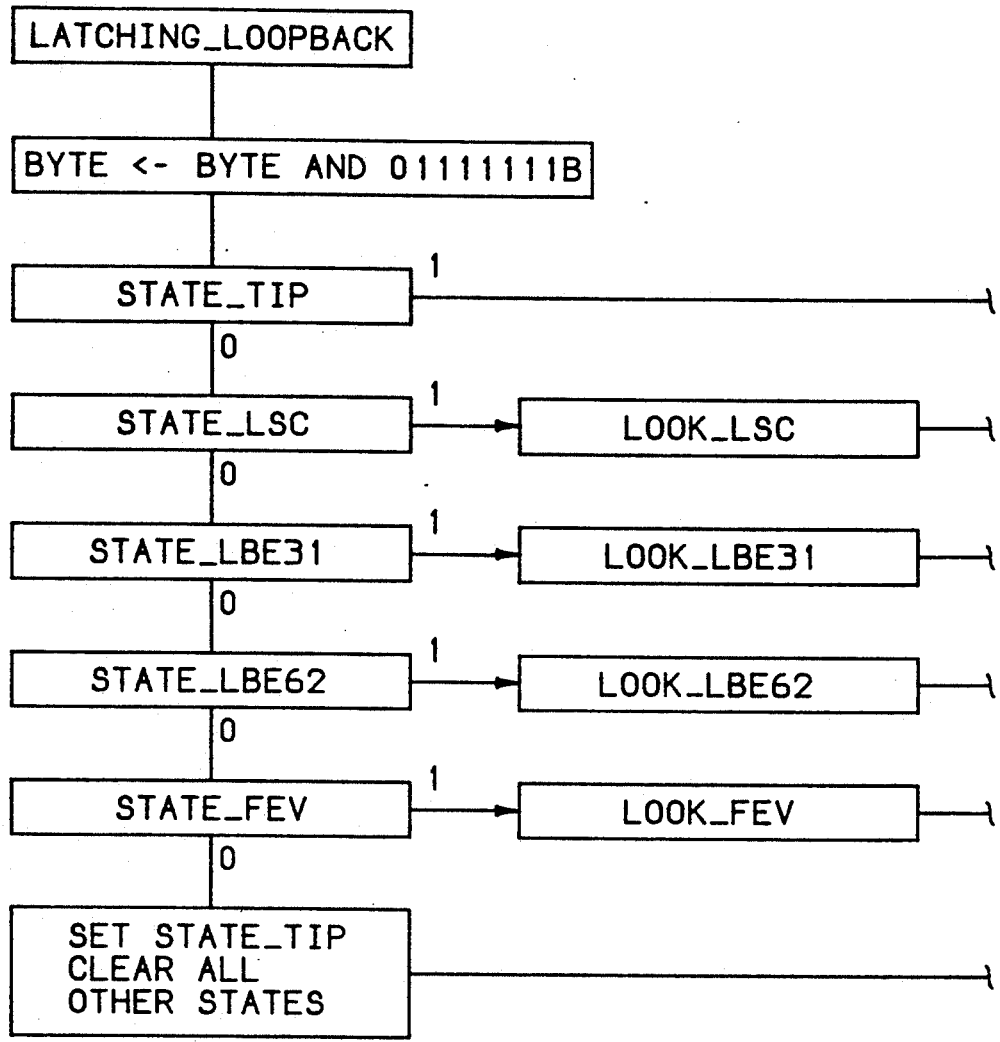
FIG. 5 shows the relation between FIGS. 5(a) and 5(b) which together represent a flow chart showing the implementation of a latching loopback procedure of the present invention.
Figure 5:
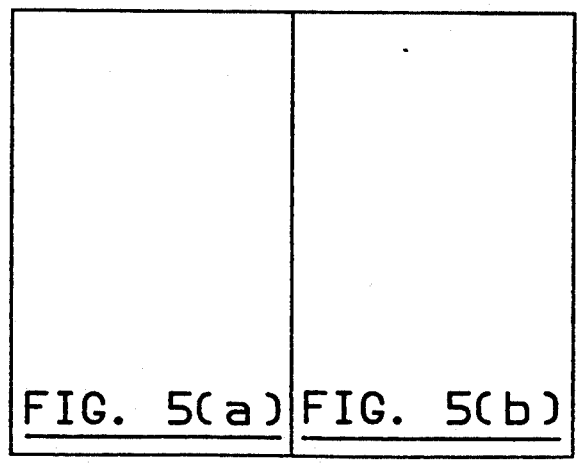
Figure 5B:
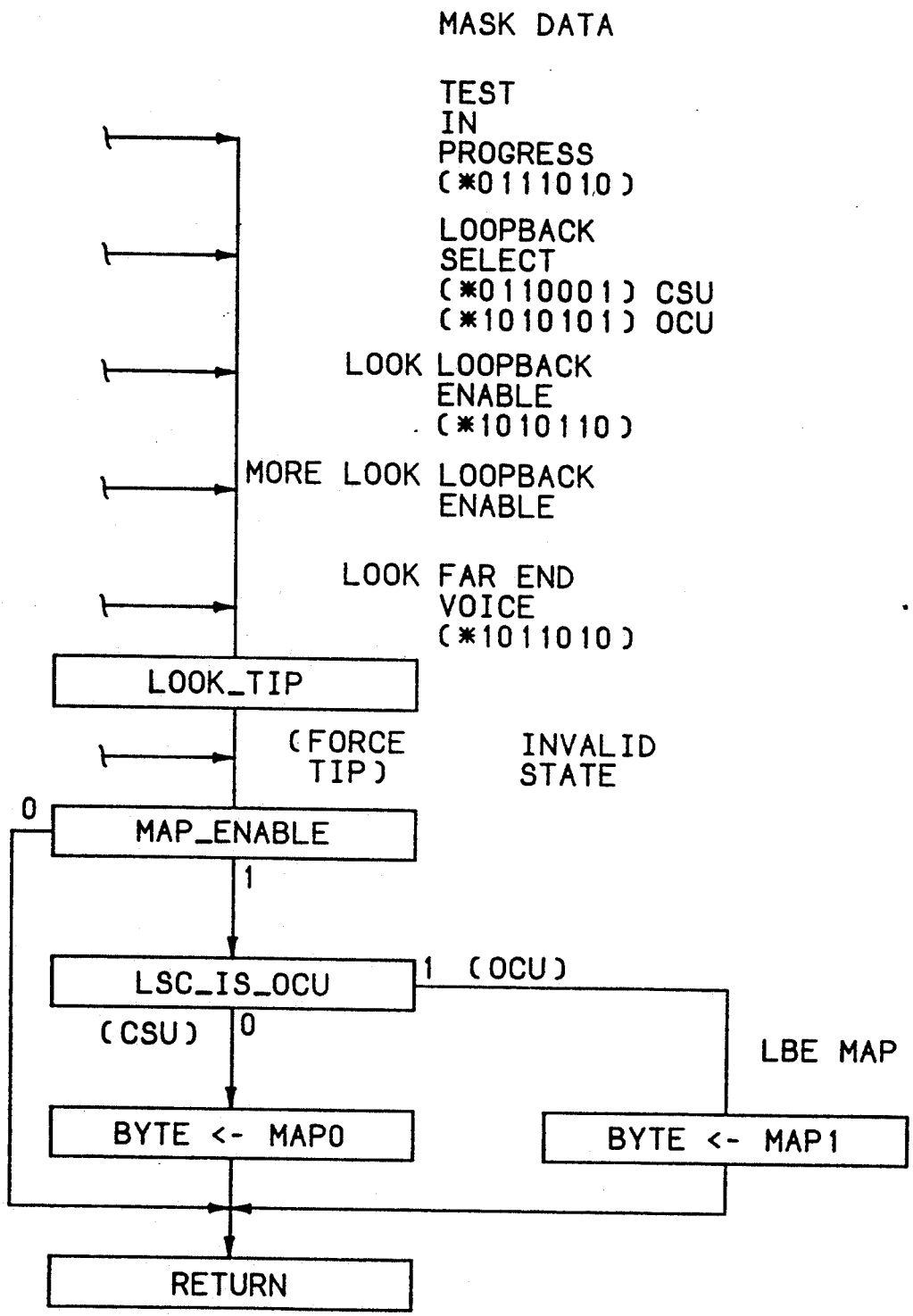
Figure 11B:
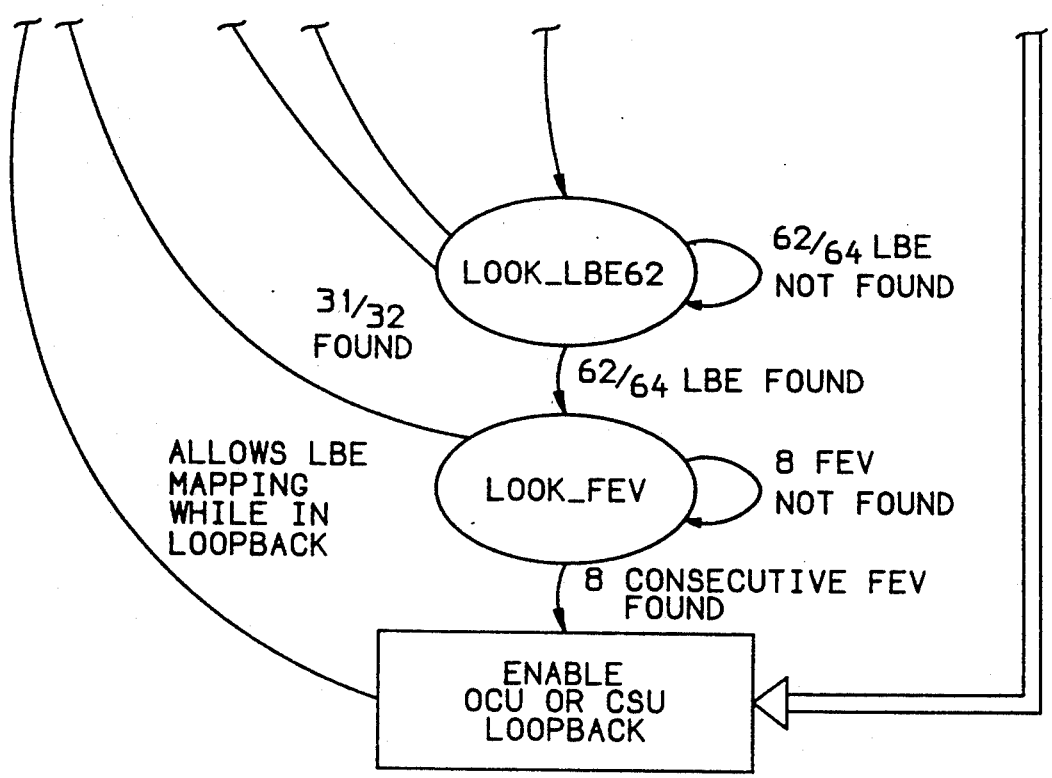
FIG. 11 shows the relation between FIGS. 11(a) and 11(b) which together represent a state diagram showing the implementation of the latching loopback procedure.
Figure 11:
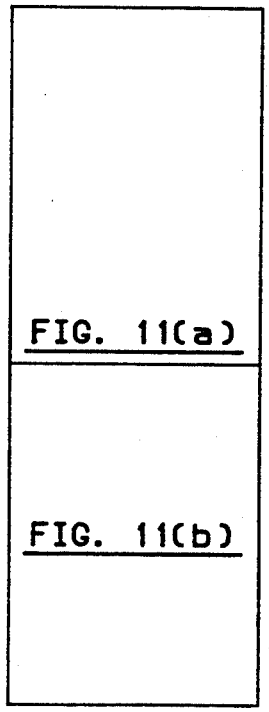
Figure 11A:
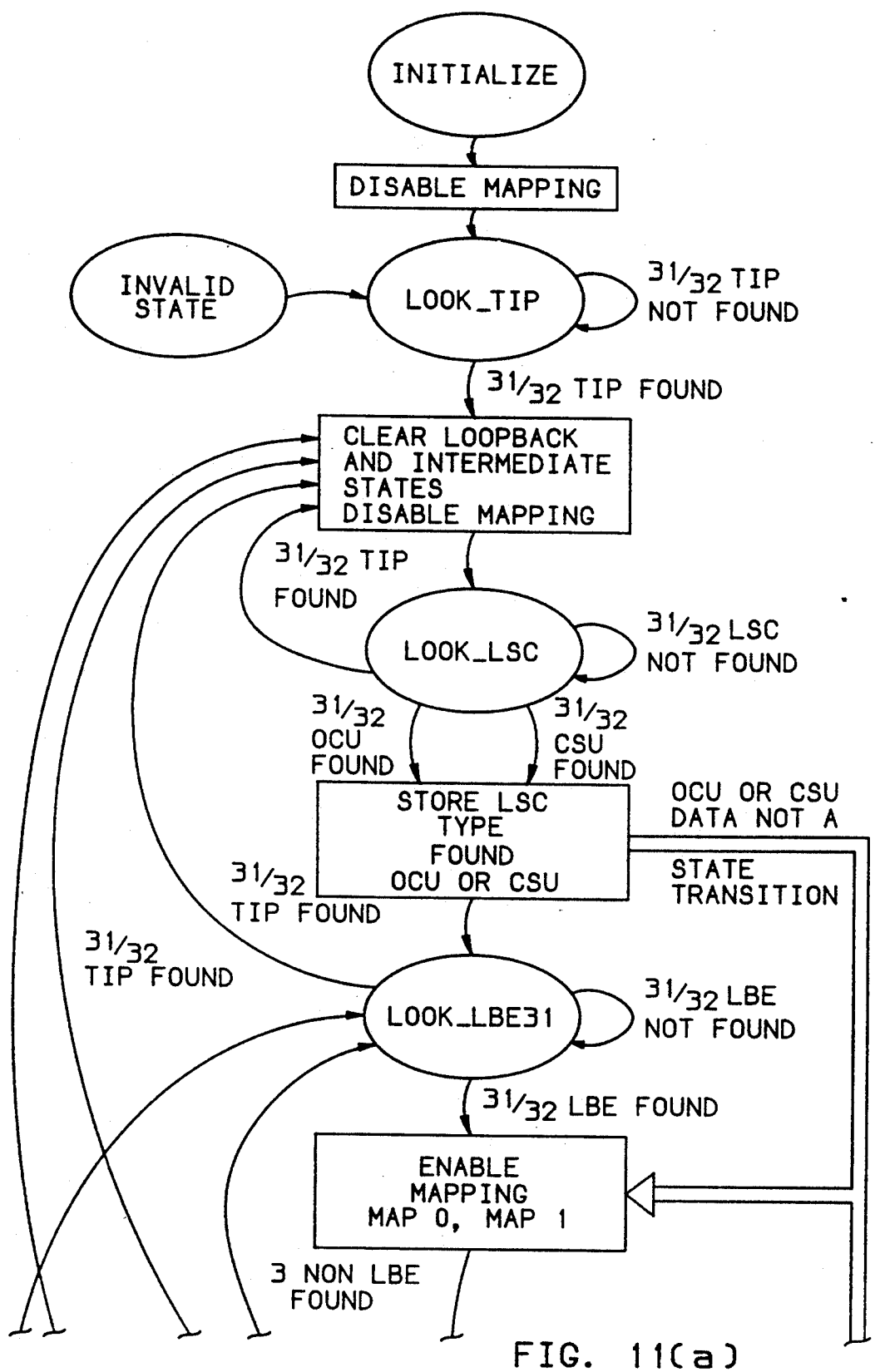

Referring to FIGS. 5(a) and 5(b) which are related as shown in FIG. 5, there is shown a high-level flowchart for the overall latching loopback procedure. Essentially, the program involves a state machine, as shown in FIG. 11, which operates in five sequential states, including a TIP state, an LSC state, an LBE 31 state, an LBE 62 state and an FEV state. In each of the designated states, the program looks for a control code byte configuration corresponding to the designated state. The rectangular blocks at the exit of the states are provided to describe actions taken when the control code byte looked for in the state is found. In the TIP state, which is the normal state of the machine when data is being transferred and when a control code has not been acted upon, the state machine continually looks for a TIP byte indicating the start of a new test procedure. In each of the other states, the machine first looks to determine if the particular state byte is present, so that the proper action may be taken, but also looks for a TIP byte to determine if the states should be cleared and a new test initiated.

As indicated in FIG. 4, the latching loopback is initiated for every new byte that is received. The first step in the implementation of latching loopback is to perform a logical AND operation with the received byte and a mask byte, as shown in FIGS. 5(a) and 5(b). The effect of this logical AND operation is to force the first bit of the received byte to a logic level 0, since the first bit is a "don't care" bit in regard to the processing of control codes. The byte is then further processed depending upon the particular state of the state machine. If the machine is in the TIP state, the program looks for the presence of a TIP byte. If the machine is in the LSC state, the program will first look for an LSC byte and afterwards look for TIP byte. In like manner, depending upon the state of the machine, the program will look for an LBE 31 byte, an LBE 62 byte or FEV byte, and thereafter look for a TIP byte. If the machine determines that it is not in any of the afore-mentioned states, the TIP state is automatically set, and all other possible states are cleared.

After the LOOK TIP step, a determination is made if MAP ENABLE is set to 1. If so, a further determination is made as to whether LSC is OCU, in which event a MAP 1 byte will be delivered to the office channel unit functions circuit 36. If LSC is not OCU, a MAP 0 byte will be delivered to the office channel unit functions circuit 36, indicating that loopback is to take place at the CSU. The setting of the MAP ENABLE and the LSC will be discussed subsequently. The functions of the various sub-blocks in FIGS. 5(a) and 5(b) are shown in FIGS. 6–10 and will now be discussed.

Figure 6:
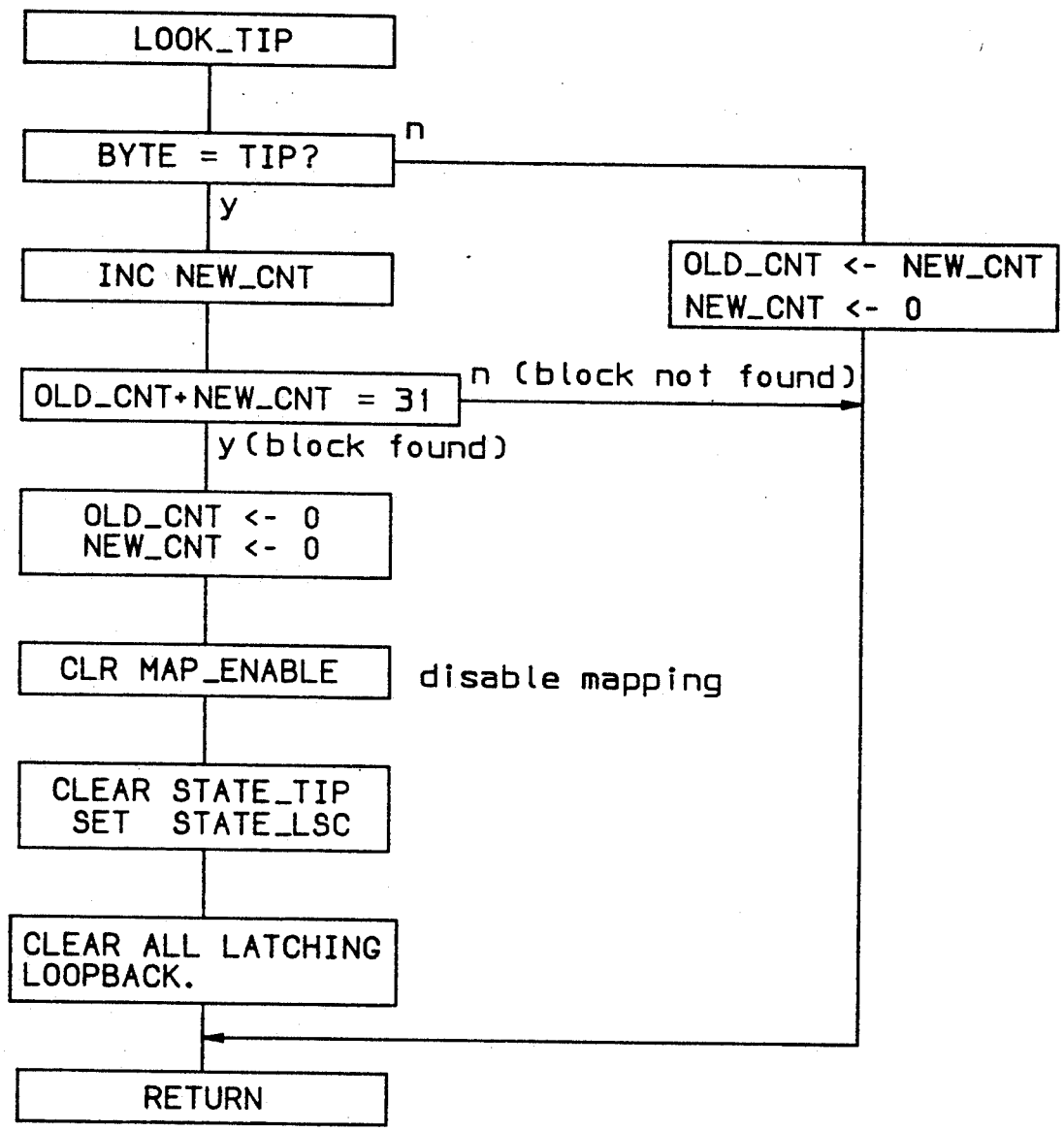
FIG. 6 is a flow chart showing the implementation of the LOOK TIP procedure of FIG. 5, using the algorithm of the present invention.

FIG. 6 shows the procedure performed in the LOOK TIP block, at which time a comparison is made to detect a TIP byte having a format of S0111010. If a TIP byte is detected, a count running in a new counter Z(2) is incremented, after which a count contained in an old counter Z(1) plus the count of the new counter is added. If the total count is 31, the desired block is found, at which time both the old counter and the new counter are set to zero, a MAP ENABLE bit is set to zero, indicating a new loopback is being set up, and the TIP state is cleared and the LSC state is set, so that the program will begin looking for LSC bytes. In addition, any other possible latching loopbacks that may have been initiated are cleared.

If the TIP byte was not detected, the count in the old counter is removed and replaced with the count in the new counter, while the new counter is set to zero. This, in effect, discards the oldest variable length window, and the new counter is prepared to again start counting a window when a new TIP byte arrives. After adjustment of the counters, or if the block is not found by the addition of the old counter and the new counter not equalling 31, the TIP loop is finished, and the processor returns to FIGS. 5(a) and 5(b) at the end of the LOOK TIP block.

Figure 7B:
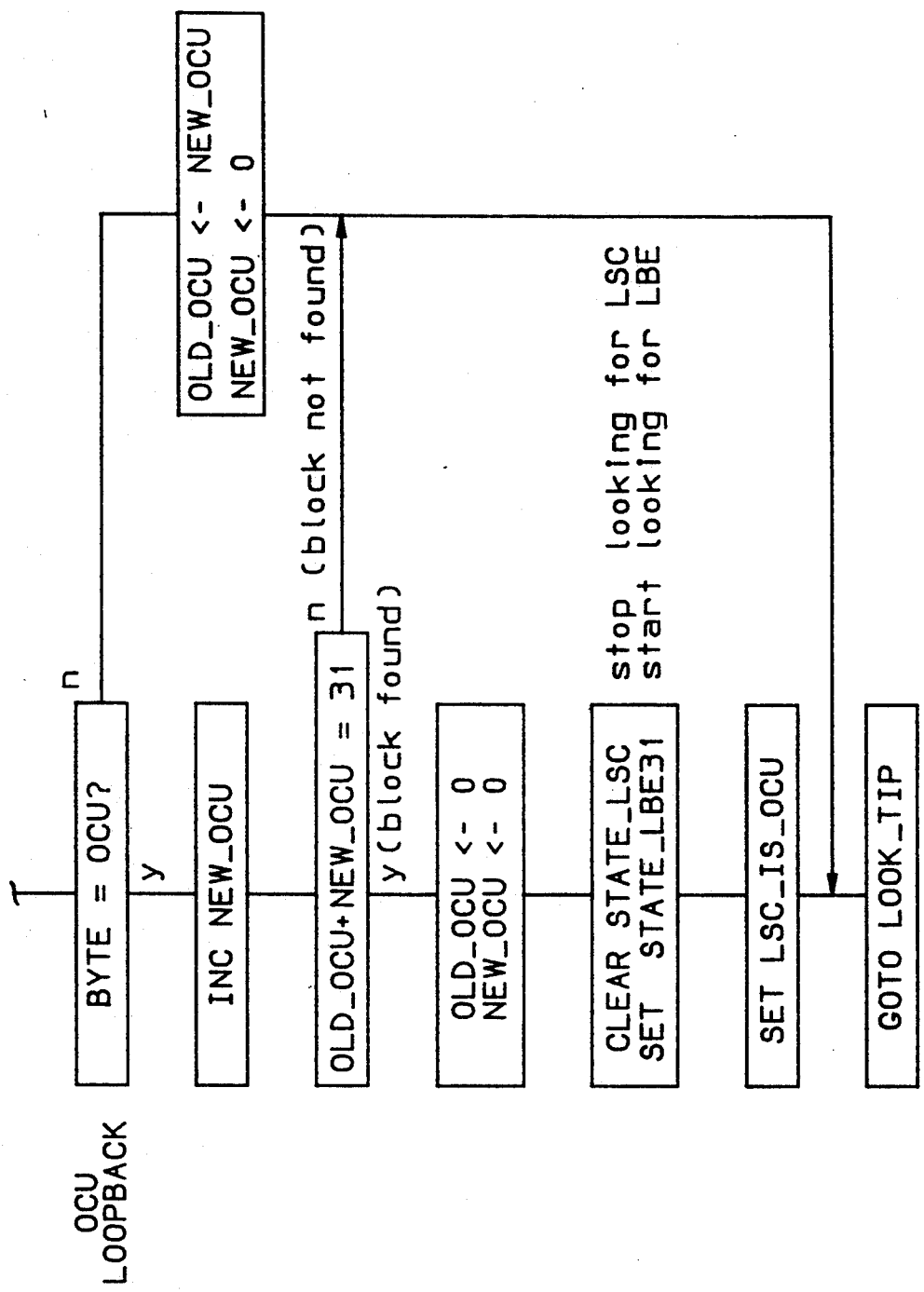
FIG. 7 shows the relation between FIGS. 7(a) and 7(b) which together represent a flow chart showing the implementation of a LOOK LSC procedure shown in FIG. 5, using the algorithm of the present invention.

Referring to FIGS. 7(a) and 7(b) which are related as shown in FIG. 7, there is shown a flow chart for the process performed in the block identified as LOOK LSC in FIGS. 5(a) and 5(b). In the LOOK LSC block, the function performed is to identify 31 out of 32 bytes of one of two control codes indicating where the latching loopback should take place. The code for a loopback at the office channel unit is 1010101, while the code for the loopback at the customer service unit is 0110001. In the LOOK LSC procedure, a first compare is undertaken to determine if the byte is a CSU byte; if so, a new CSU counter is incremented by 1. After incrementing the new CSU counter, an addition is done between the counts in an old CSU counter and the new CSU counter to determine if the count totals 31. If the count totals 31, both the old and the new counters are set to zero, the state LSC is cleared, and the state LBE 31 is set, and an LSC bit is cleared, indicating that LSC is CSU.

If the byte is not the CSU code, the old CSU count is replaced with the new CSU count, and the new CSU is set to zero, after which the LSC procedure determines if the byte is for an OCU loopback by comparing the received byte to the OCU byte and a procedure similar to that for the CSU loop is repeated. If 31 OCU bytes have been counted in the old and new counters, the LSC bit is set, indicating that LSC is OCU, and the procedure then reverts to the LOOK TIP procedure set forth in FIG. 6.

Figure 8:
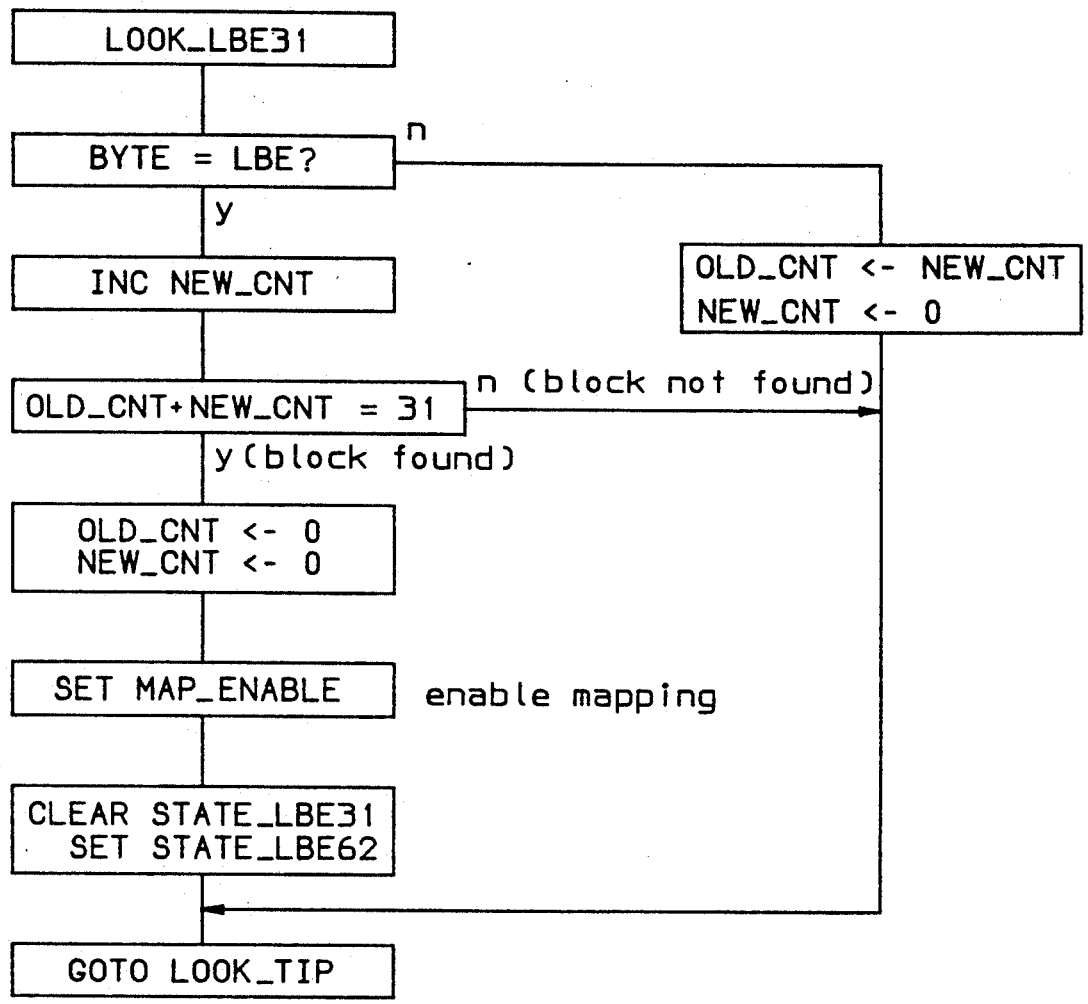
FIG. 8 is a flow chart showing the LOOK LBE 31 procedure of FIG. 5, using the algorithm of the present invention.

If the state machine is in the LBE 31 state, the procedure first undergoes a LOOK LBE 31 procedure, which is outlined by the flow chart shown in FIG. 8. The flow chart of FIG. 8 for performing the LBE 31 LOOK procedure is essentially identical to the flow chart for the LOOK TIP and the individual flow charts for CSU and OCU in the LOOK LSC procedure. There are some slight differences, in that when an LBE 31 is identified, a MAP ENABLE bit is set to 1, indicating that received LBE bytes should be mapped into MAP-0 or MAP-1, depending on whether the LSC is a CSU or an OCU command. If the MAP bit is enabled, the mapping will take place as shown in the flow chart of FIGS. 5(a) and 5(b). Detection of the LBE 31 control code causes the LBE 31 state to be cleared and the LBE 62 state to be set. Upon completion of the LOOK LBE 31 loop, the procedure reverts to the LOOK TIP procedure, as indicated in FIGS. 5(a) and 5(b) and described in conjunction with FIG. 6.

Figure 9A:
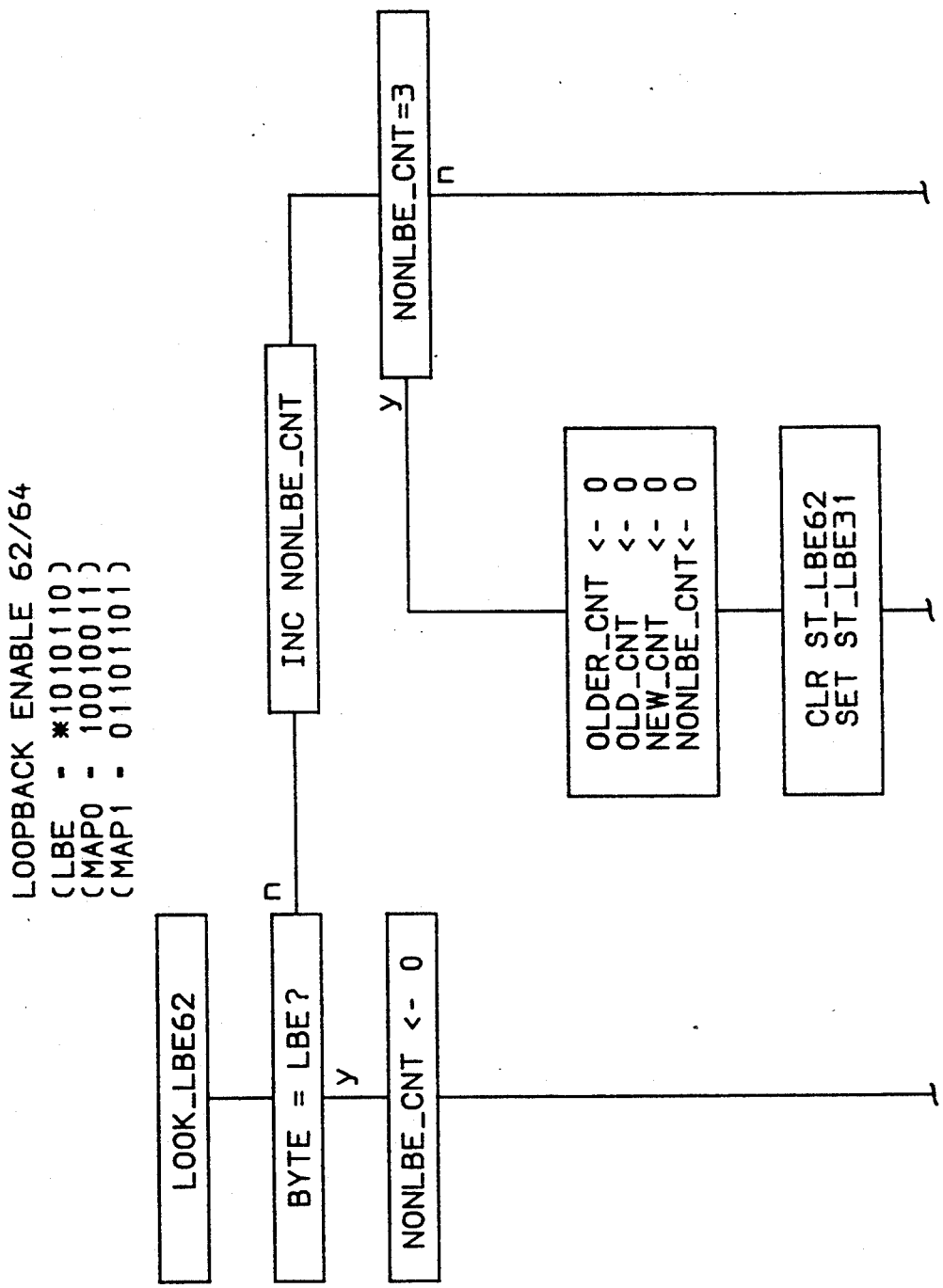
FIG. 9 shows the relation between FIGS. 9(a) and 9(b) which together represent a flow chart showing the LOOK LBE 62 procedure of FIG. 5, using the algorithm of the present invention.
Figure 9B:
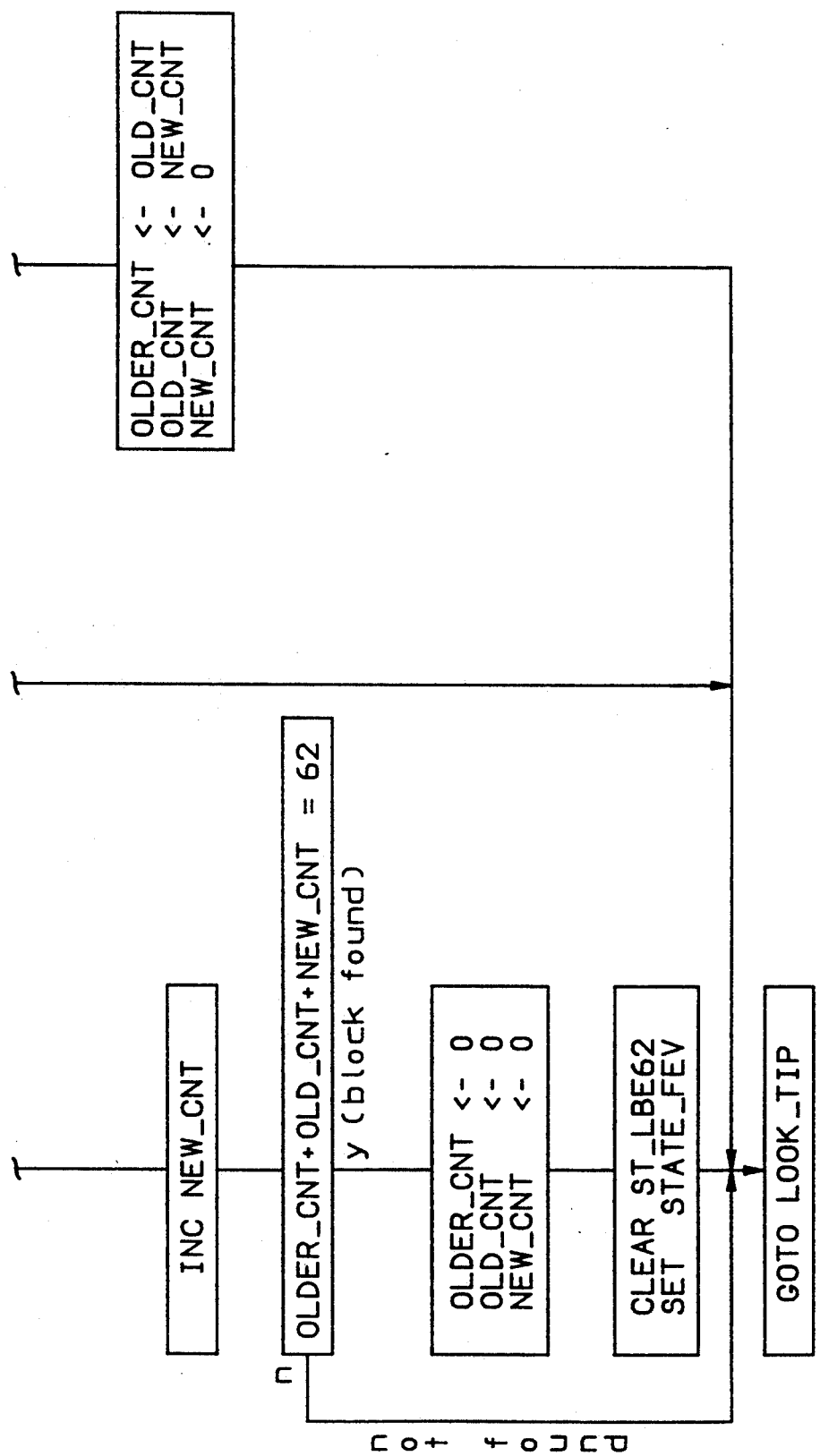

After the LBE 62 state is set in accordance with the procedure outlined in FIG. 8, the state machine causes the LOOK LBE 62 procedure to be initiated, which procedure is described in conjunction with the flow chart of FIGS. 9(a) and 9(b) which are related as shown in FIG. 9. Referring to FIGS. 9(a) and 9(b), it is seen that if the byte compares to an LBE byte, a non-LBE counter is set to zero, and a new count counter is incremented by 1, after which the count in an older counter is added to the count in an old counter, which is added to the count in the new counter; if the sum is 62, the LBE 62 block will have been identified, and all three counters will be reset to zero, the LBE 62 state will be cleared, the FEV state will be set, and the procedure will revert to the LOOK TIP procedure. If the count within the three counters does not equal 62, the procedure again goes to the LOOK TIP procedure. If the byte is not an LBE byte, the non-LBE counter will be incremented, and if the count in the non-LBE counter is found to be 3, all four counters including the older counter, the old counter, and new counter and the non-LBE counter will be set to zero, the LBE 62 state will be cleared, and the LBE 31 state will be set, and the procedure will revert to the LOOK TIP procedure. Thus, three consecutive non-LBE bytes will cause the state machine to back up to the LBE 31 state.

If the non-LBE counter has not reached a count of 3, the older counter assumes the count contained in the old counter, the old counter assumes the count contained in the new counter, and the new counter is set to zero, and the procedure reverts to the LOOK TIP procedure.

Figure 10:
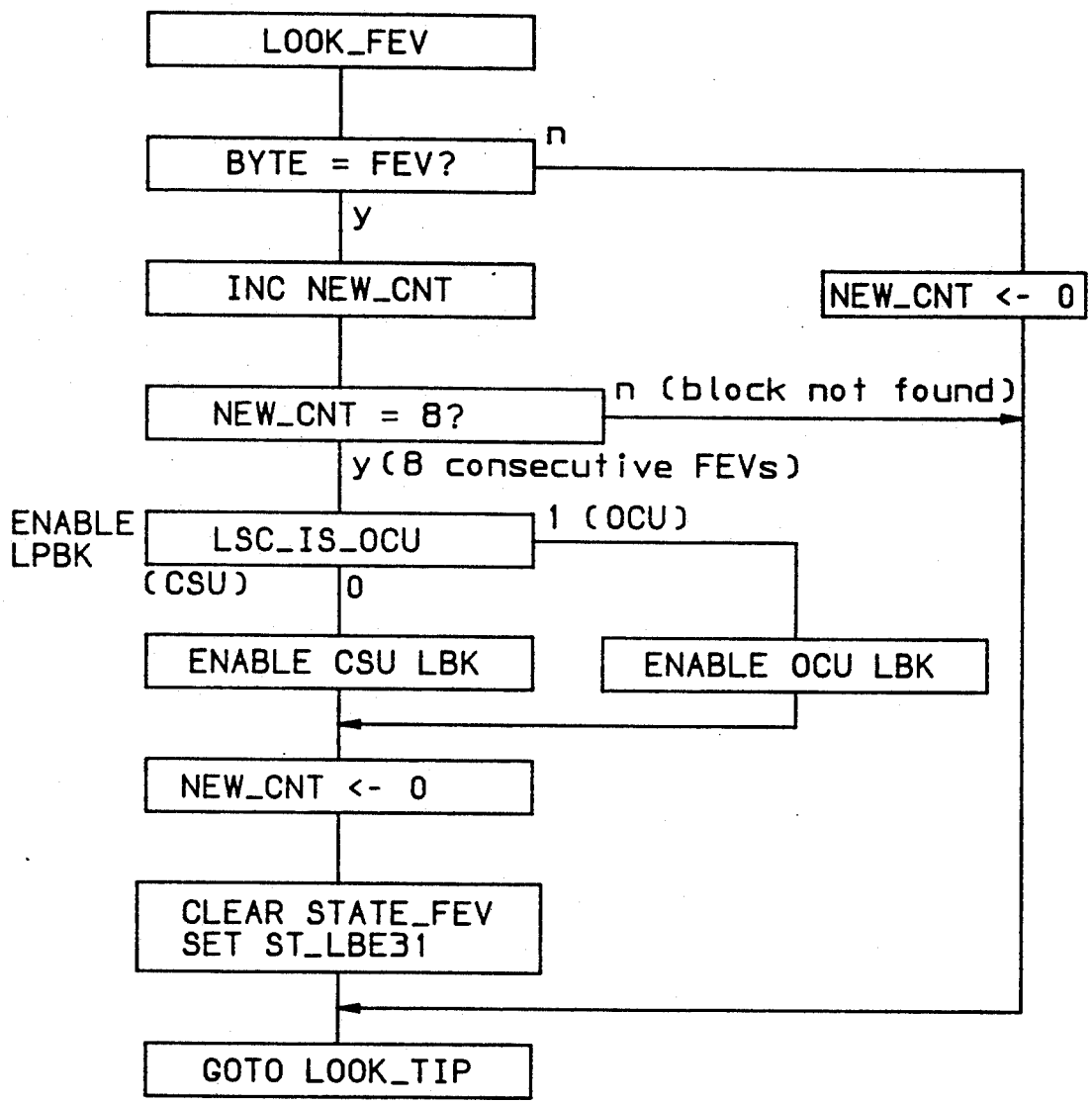
FIG. 10 is a flow chart showing the LOOK FEV procedure of FIG. 5.

As indicated previously, when the LBE 62 is properly identified and the block is found, the FEV state is set, so that the next byte will be processed in accordance with the LOOK FEV procedure, as outlined in FIG. 10.

Referring to FIG. 10, it is seen that the byte is compared to the FEV byte. If a compare is not found, a new counter is set to zero, and the process reverts to the LOOK TIP procedure. If the FEV byte is found, the new counter is incremented by 1, and a determination is made as to whether the new counter has reached a count of 8. If not, the process reverts to the LOOK TIP process. If the new counter is at a count of 8, it is determined whether the LSC byte is 1, indicating that a loopback is to take place at the office channel unit, or if the LSC byte is 0, the loopback is to take place at the customer service unit. In either event, an appropriate loopback is enabled, whether it be the office channel unit loopback or the customer service unit loopback, by providing the outputs at the microprocessor outputs 48 and 52 respectively. Upon enabling of either loopback, the new counter is set to zero, the FEV state is cleared, and the LBE 31 state is set. In the LBE 31 state, LBE bytes sent by the test equipment are detected and, with the MAP ENABLE bit set, each LBE byte is mapped into either an MAP-0 or an MAP-1 bytes. The MAP bytes are then delivered to the office channel unit functions circuit 36 and are eventually looped back to the test equipment, which can verify if looping occurred at the correct point by detecting the CSU or OCU mapping of the byte. After completion of each LOOK LBE 31 procedure, the LOOK TIP procedure is initiated to continuously look for a TIP byte which would indicate a new test is to be initiated or the old test terminated.

Thus, it is seen how the present invention uses a variable length window algorithm in which the number of compares in a plurality of windows of varying length are added to determine when M out of N compares have been achieved. The number of windows required is equal to $N-M+1$. Each window is represented by a counter, the counts of which are summed; when the total reaches M, M out of N has been detected. In the process loops requiring detection of 31 out of 32 bytes, two counters are used, an old counter and a new counter, both of which are set to zero, when a block is identified, and when the desired byte is not sensed, the new counter is set to zero, with the count previously in the new counter reverting to the old counter, so that in effect the old window is discarded and a new window with a zero count is established. The effect of two non-compares in a row will result in zero being set in both counters. In the 62 out of 64 detection, three counters are utilized to add up the number of bytes comparing in three separate windows.

Thus, the present invention provides a unique algorithm for use in a data port for providing latching loopback functions. The algorithm is extremely efficient, in that it requires one comparison per byte and requires only $N-M+1$ storage units for counting the identified bytes in each window. Due to the lesser number of comparisons that must be made, less expensive and slower microprocessors may be used, while still providing realtime M out of N detection. In addition, less RAM storage area is required.

```
****************************************************
*                                                   *
*   Archimedes 8051 Assembler V1.80/MD2    08/Feb/90  21:41:22  *
*                                                   *
*    Source  =  latch.s03                           *
*    List    =  latch.lst                           *
*    Object  =  latch.r03                           *
*    Options =  sf                                  *
*                                                   *
*           (c) Copyright Archimedes Software 1985  *
****************************************************

1                  ;****************************************************************
 2                  ;*                                                              *
 3  0000            $SEGMENT    NAME    LATCH
 4  0000                        RSEG    CODE(8)     ;RELOCATABLE SEGMENT. STARTING ADDRESS ROUNDED UP
 5                  ;****************************************************************
 6                  ;*                                                              *
 7                  ;*    FILE NAME:       LATCH.S03                                *
 8                  ;*    AUTHORS:         Marc Fain 01-25-90                       *
 9                  ;*    DEVELOPMENT TOOLS:                                        *
10                  ;*       HARDWARE:     METAICE-51 VERSION 1.4                   *
11                  ;*       SOFTWARE:     Archimedes 8051 assembler V????          *
12                  ;*                     Archimedes 8051 simulator V????          *
13                  ;*                                                              *
14                  ;*    FUNCTION:                                                 *
15                  ;*       Latching loopback is performed by recognition          *
16                  ;*       of the DCU and CHANNEL latching loopback control       *
17                  ;*       code sequences. Signal LATCH_DCU or LATCH_CSU on the   *
18                  ;*       circuit board is pulled low to enable the loopback.    *
19                  ;*                                                              *
20                  ;* R7 IS MODIFIED IF MAPPING IS REQUIRED. R7 CONTAINS IN_BYTE,  *
21                  ;* THE DATA JUST READ IN                                        *
22                  ;****************************************************************
23                  ;This latching loopback algorithm works with the following types of test sets:
24                  ;   1) Byte stuff control codes
25                  ;   2) Do not byte stuff control codes
26                  ;   3) Manually generated control codes with all 1's between control code
27                  ;      changes
28                  ;
29                  ;Current list of test set types: (as of 01-17-90)
30                  ; Type 1: TPI portable automatic test sets
31                  ; Type 2:
                    ; Type 3: KS test set
                    ;:::::::::::::::::::::
```

```
; GLOBAL VARIABLES ;
;;;;;;;;;;;;;;;;;;
        EXTERN  STATE,MBYTE
        EXTERN  LSC_IS_OCU,ECBYPASSN,MAP_ENABLE,LATCH_OCU,LATCH_CSU,EXT_OUT
        EXTERN  OLD_TIP,NEW_TIP,OLD_CSU,NEW_CSU,OLD_OCU,NEW_OCU,OLD_LBE,NEW_LBE
        EXTERN  NEW_CNT,OLD_CNT,OLDER_CNT,NONLBE_CNT
        EXTERN  ST_TIP,ST_LSC,ST_LBE31,ST_LBE62,ST_FEV

PUBLIC  LATCH

;;;;;;;;;;;;;;;;;
; LOCAL CONSTANTS ;
;;;;;;;;;;;;;;;;;
STATE_TIP    SET   00010000B        ;STATE LOOK FOR TIP
STATE_LSC    SET   00001000B        ;STATE LOOK FOR LOOP SELECT CODE
STATE_LBE31  SET   00000100B        ;STATE LOOK FOR 31/32 LOOP BACK ENABLE
STATE_LBE62  SET   00000010B        ;STATE LOOK FOR TIP
STATE_FEV    SET   00000001B        ;STATE LOOK FOR FAR END VOICE

;Note the following bits are reversed because TA-77 shows MSB (b8) on right
;This program uses MSB on left
TIP    SET  01011100B    ;5CH Test in progress control code
MAP0   SET  11001001B    ;C9H Channel latching loopback map code
MAP1   SET  10110110B    ;B6H OCU latching loopback map code
CSU    SET  10001100B    ;8CH Channel Loopback select code
OCU    SET  10101010B    ;AAH OCU Loopback select code
LBE    SET  01101010B    ;6AH Loopback enable control code
FEV    SET  01011010B    ;5AH Far end voice control code

;;;;;;;;;;;
; MACROS ;
;;;;;;;;;;;

;;;;;;;;;;;
; LOOK31 ;
;;;;;;;;;;;
;31 OUT OF 32 TARGET BYTE SEARCH
;CALLED BY %LOOK31 TARGET_BYTE,STATE_X
                    ;WHERE TARGET_BYTE = BYTE THAT IS BEING SOUGHT
                    ;      STATE_X    = NEXT STATE TO PROCESS
;MUST HAVE COMMANDS TO EXECUTE FOR BLOCK FOUND AFTER LABEL BLK_FND_\0
;MUST HAVE DONE_\0: LABEL AFTER BLK_FND_\0 CODE

MACRO   %LOOK31         ;LOOK FOR 31 OUT OF 32 \0s

MOV     A,MBYTE
```

```
80              CJNE    A,#\0,NO_\0         ;\0?
81                                           ;\0 FOUND
82              INC     NEW_\0               ;IF NOT (OLD_\0 + NEW_\0 = 31D)
83              MOV     A,OLD_\0
84              ADD     A,NEW_\0
85              CJNE    A,#1FH,DONE_\0       ;THEN EXIT
86
87              MOV     OLD_\0,#00H          ;ELSE CLEAR WINDOW LENGTH COUNTERS
88              MOV     NEW_\0,#00H
89              MOV     STATE,#\1
90              SJMP    BLK_FND_\0           ;DO WHAT SHOULD BE DONE AFTER 31/32 BLK FOUND
91
92      NO_\0:  MOV     OLD_\0,NEW_\0        ;BUMP OLD WINDOW
93              MOV     NEW_\0,#00H          ;BEGIN NEW WINDOW
94              SJMP    DONE_\0
95              ENDMAC
96
97      ;;;;;;;;;;;;;;;;;
98      ; END MACROS ;
99      ;;;;;;;;;;;;;;;;;
100
101     ;DS0 byte data format used by this program:
102     ;
103     ;      b8   b7   b6   b5   b4   b3   b2   b1      (-- TA-77 notation
104     ;     ---------------------------------------
105     ;    : C  : D6 : D5 : D4 : D3 : D2 : D1 : S :
106     ;     ---------------------------------------
107     ;    C = 0 for control code, 1 for customer data
108     ;    Dn = customer data or network control code
109     ;    S = subrate framing bit when DS-0B
110     ;        "don't care" when received using DS-0A
111     ;        1 when transmitted as part of DS-0A signal or for zero code suppression
112
113     ;;;;;;;;;;;;;;;;;;;;;;;;;;;;;;;;;;;;
114     ; MODULE EXECUTION STARTS HERE ;
115     ;;;;;;;;;;;;;;;;;;;;;;;;;;;;;;;;;;;;
116             LATCH:
0000    LATCHLBK: MOV   MBYTE,R7             ;GET NEWEST BYTE IN_BYTE AND
0000 8F00       ANL    MBYTE,#11111110B     ;MASK LSB (S bit)
0002 5300FE
118
119     CK_TIP: JNB    ST_TIP,CK_LSC        ;STATE=TIP?
0005 300003     LJMP   LOOK_TIP
0008 020101
120
121     CK_LSC: JNB    ST_LSC,CK_LBE31      ;STATE=LBC?
122             LJMP   LOOK_LSC
```

| Line | Addr | Code | Label | Op | Operands | Comment |
|---|---|---|---|---|---|---|
| 126 | 0011 | 300003 | CK_LBE31: | JNB | ST_LBE31,CK_LBE62 | ;STATE=LBE31? |
| 127 | 0014 | 020071 | | LJMP | LOOK_LBE31 | |
| 128 | | | | | | |
| 129 | 0017 | 300003 | CK_LBE62: | JNB | ST_LBE62,CK_FEV | ;STATE=LBE62? |
| 130 | 001A | 020095 | | LJMP | LOOK_LBE62 | |
| 131 | | | | | | |
| 132 | 001D | 300003 | CK_FEV: | JNB | ST_FEV,BAD_STATE | ;STATE=FEV? |
| 133 | 0020 | 0200DC | | LJMP | LOOK_FEV | |
| 134 | | | | | | |
| 135 | | | | | | ;RECOVER FROM NO STATE SELECTED |
| 136 | 0023 | 750010 | BAD_STATE: | MOV | STATE,#00010000B | ;FORCE STATE_TIP |
| 137 | 0026 | 80DD | | SJMP | CK_TIP | |
| 138 | | | | | | |
| 139 | | | ;;;;;;;;;;;;;;;;;;;;;;;;;;;;;;;; | | | |
| 140 | | | ; LOOK FOR LOOP SELECT CODE ; | | | |
| 141 | | | ;;;;;;;;;;;;;;;;;;;;;;;;;;;;;;;; | | | |
| 142 | 0028 | | LOOK_LSC: | | | |
| 143 | 0028 | | LOOK_CSU: | %LOOK31 | CSU,STATE_LBE31 | |
| | 0028 | E500 | | MOV | A,MBYTE | |
| | 002A | B48C14 | | CJNE | A,#CSU,NO_CSU | ;CSU? |
| | | | | | | |
| | 002D | 0500 | | INC | NEW_CSU | ;CSU FOUND |
| | 002F | E500 | | MOV | A,OLD_CSU | ;IF NOT (OLD_CSU + NEW_CSU = 31D) |
| | 0031 | 2500 | | ADD | A,NEW_CSU | |
| | 0033 | B41F15 | | CJNE | A,#1FH,DONE_CSU | ;THEN EXIT |
| | | | | | | |
| | 0036 | 750000 | | MOV | OLD_CSU,#00H | ;ELSE CLEAR WINDOW LENGTH COUNTERS |
| | 0039 | 750000 | | MOV | NEW_CSU,#00H | |
| | 003C | 750004 | | MOV | STATE,#STATE_LBE31 | |
| | 003F | 8008 | | SJMP | BLK_FND_CSU | ;DO WHAT SHOULD BE DONE AFTER 31/32 BLK FOUND |
| | | | | | | |
| | 0041 | 850000 | NO_CSU: | MOV | OLD_CSU,NEW_CSU | ;BUMP OLD WINDOW |
| | 0044 | 750000 | | MOV | NEW_CSU,#00H | ;BEGIN NEW WINDOW |
| | 0047 | 8002 | | SJMP | DONE_CSU | |
| 144 | 0049 | C200 | BLK_FND_CSU: | CLR | LSC_IS_OCU | ;0 = LSC IS CHANNEL LOOPBACK |
| 145 | 004B | | DONE_CSU: | | | |
| 146 | | | | | | |
| 147 | 004B | | LOOK_OCU: | %LOOK31 | OCU,STATE_LBE31 | |
| | 004B | E500 | | MOV | A,MBYTE | |
| | 004D | B4AA14 | | CJNE | A,#OCU,NO_OCU | ;OCU? |
| | | | | | | |
| | 0050 | 0500 | | INC | NEW_OCU | ;OCU FOUND |
| | 0052 | E500 | | MOV | A,OLD_OCU | ;IF NOT (OLD_OCU + NEW_OCU = 31D) |
| | 0054 | 2500 | | ADD | A,NEW_OCU | |

```
                                   CJNE    A,#1FH,DONE_OCU ;THEN EXIT   ;ELSE CLEAR WINDOW LENGTH COUNTERS
0059  750000                       MOV     OLD_OCU,#00H
005C  750000                       MOV     NEW_OCU,#00H
005F  750004                       MOV     STATE,#STATE_LBE31
0062  8008                         SJMP    BLK_FND_OCU     ;DO WHAT SHOULD BE DONE AFTER 31/32 BLK FOUND 0064  850000            NO_OCU:    MOV     OLD_OCU,NEW_OCU ;BUMP OLD WINDOW
0067  750000                       MOV     NEW_OCU,#00H    ;BEGIN NEW WINDOW
006A  8002                         SJMP    DONE_OCU
006C  D200              BLK_FND_OCU: SETB  LSC_IS_OCU      ;1 = LSC IS OCU LOOPBACK
006E  020101            DONE_OCU: LJMP     LOOK_TIP

;;;;;;;;;;;;;;;;;;;;;;;;;;;;;;
                       ; LOOK FOR LOOP BACK ENABLE CODE ;
                       ;;;;;;;;;;;;;;;;;;;;;;;;;;;;;;
0071                   LOOK_LBE31: %LOOK31 LBE,STATE_LBE62

0071  E500                         MOV     A,MBYTE
0073  B46A14                       CJNE    A,#LBE,NO_LBE   ;LBE?

0076  0500                         INC     NEW_LBE         ;LBE FOUND
0078  E500                         MOV     A,OLD_LBE       ;IF NOT (OLD_LBE + NEW_LBE = 31D)
007A  2500                         ADD     A,NEW_LBE
007C  B41F13                       CJNE    A,#1FH,DONE_LBE ;THEN EXIT 007F  750000                       MOV     OLD_LBE,#00H    ;ELSE CLEAR WINDOW LENGTH COUNTERS
0082  750000                       MOV     NEW_LBE,#00H
0085  750002                       MOV     STATE,#STATE_LBE62
0088  8008                         SJMP    BLK_FND_LBE     ;DO WHAT SHOULD BE DONE AFTER 31/32 BLK FOUND 008A  850000            NO_LBE:    MOV     OLD_LBE,NEW_LBE ;BUMP OLD WINDOW
008D  750000                       MOV     NEW_LBE,#00H    ;BEGIN NEW WINDOW
0090  8000                         SJMP    DONE_LBE
0092                   BLK_FND_LBE:
0092  020101            DONE_LBE: LJMP     LOOK_TIP

;NOTE, THIS ROUTINE USES A TRIPLE VARIABLE SLIDING WINDOW TO PERFORM 62 OUT OF
                       ; 64 TARGET BYTE DETECTION
0095  E500              LOOK_LBE62: MOV    A,MBYTE         ;GET BYTE
0097  B46A1E                       CJNE    A,#LBE,NOT_LBE  ;IF NOT LBE THEN CHECK FOR 3 NON-LBEs
009A  750000                       MOV     NONLBE_CNT,#00H ;ELSE CLEAR COUNTER &
009D  D200                         SETB    MAP_ENABLE      ;ENABLE MAPPING
009F  0500                         INC     NEW_CNT
00A1  E500                         MOV     A,OLDER_CNT     ;IF TRIPLE WINDOW SIZE = 62D THEN
00A3  2500                         ADD     A,OLD_CNT       ;BLOCK FOUND
```

```
167                                        ADD    A,NEW_CNT
168  00A5 2500                             CJNE   A,#3EH,DONE_LBE62
169  00A7 B43E2F           FOUND_LBE62: MOV  OLDER_CNT,#00H ;CLEAR ALL 3 WINDOWS
170  00AA 750000                          MOV    OLD_CNT,#00H
171  00AD 750000                          MOV    NEW_CNT,#00H
172  00B0 750000                          MOV    STATE,#STATE_FEV ;PREPARE FOR FEV
173  00B3 750001                          SJMP   DONE_LBE62
174  00B6 8021
175  00B8 0500           NOT_LBE:  INC    NONLBE_CNT    ;LOOK FOR 3 CONSECUTIVE NON LBE BYTES
176  00BA E500                            MOV    A,NONLBE_CNT
177  00BC B40311                          CJNE   A,#03H,NOT3
178  00BF 750000           YES3:          MOV    OLDER_CNT,#00H
179  00C2 750000                          MOV    OLD_CNT,#00H
180  00C5 750000                          MOV    NEW_CNT,#00H
181  00C8 750000                          MOV    NONLBE_CNT,#00H
182  00CB 750004                          MOV    STATE,#STATE_LBE31 ;PREPARE TO FALL BACK TO STATE_LBE31
183  00CE 8009                            SJMP   DONE_LBE62
184
185  00D0 850000           NOT3:          MOV    OLDER_CNT,OLD_CNT ;CLOSE OLDER WINDOW, OPEN NEW WINDOW
186  00D3 850000                          MOV    OLD_CNT,NEW_CNT
187  00D6 750000                          MOV    NEW_CNT,#00H
188
189  00D9 020101           DONE_LBE62: LJMP  LOOK_TIP
190
191  00DC E500            LOOK_FEV: MOV    A,MBYTE       ;LOOK FOR 8 CONSECUTIVE FEV BYTES
192  00DE B45A1A                          CJNE   A,#FEV,NOT_FEV
193  00E1 0500            YES_FEV:  INC    NEW_CNT
194  00E3 E500                             MOV    A,NEW_CNT
195  00E5 B40816                          CJNE   A,#08H,DONE_FEV ;IF 8 CONSECUTIVE FEVs THEN LOOPBACK
196
197  00E8 200004          YES_8FEV: JB     LSC_IS_OCU,LBK_OCU ;IF LSC IS OCU THEN LOOP OCU
198  00EB D200            LBK_CH:   SETB   LATCH_CSU     ;ENABLE CHANNEL LOOPBACK
199  00ED 8002                            SJMP   CLRCNT
200  00EF D200            LBK_OCU:  SETB   LATCH_OCU     ;ENABLE OCU LOOPBACK
201  00F1 750000          CLRCNT:   MOV    NEW_CNT,#00H  ;CLEAR FEV COUNT
202  00F4 750004                          MOV    STATE,#STATE_LBE31 ;PREPARE FOR LBE31 STATE
203  00F7 C200                            CLR    ECBYPASSN     ;BYPASS ERROR CORRECTION
204  00F9 8003                            SJMP   DONE_FEV
205
206  00FB 750000          NOT_FEV:  MOV    NEW_CNT,#00H  ;CLEAR FEV COUNT
207
208  00FE 020101          DONE_FEV: LJMP   LOOK_TIP
```

```
        0103 B45C14                    CJNE    A,#TIP,NO_TIP   ;TIP?

0106 0500                      INC     NEW_TIP         ;TIP FOUND
        0108 E500                      MOV     A,OLD_TIP       ;IF NOT (OLD_TIP + NEW_TIP = 31D)
        010A 2500                      ADD     A,NEW_TIP
        010C B41F1B                    CJNE    A,#1FH,DONE_TIP ;THEN EXIT 010F 750000                    MOV     OLD_TIP,#00H    ;ELSE CLEAR WINDOW LENGTH COUNTERS
        0112 750000                    MOV     NEW_TIP,#00H
        0115 750008                    MOV     STATE,#STATE_LSC
        0118 8008                      SJMP    BLK_FND_TIP     ;DO WHAT SHOULD BE DONE AFTER 31/32 BLK FOUND 011A 850000           NO_TIP:  MOV     OLD_TIP,NEW_TIP ;BUMP OLD WINDOW
        011D 750000                    MOV     NEW_TIP,#00H    ;BEGIN NEW WINDOW
        0120 8008                      SJMP    DONE_TIP
211     0122 C200             BLK_FND_TIP: CLR LATCH_OCU       ;CLEAR OCU LATCHING LOOPBACK
212     0124 C200                      CLR     LATCH_CSU       ;CLEAR CHANNEL LATCHING LOOPBACK
213     0126 D200                      SETB    ECBYPASSN       ;DO NOT BYPASS ERROR CORRECTION
214     0128 C200                      CLR     MAP_ENABLE      ;DISABLE MAPPING OF LSC BYTES
215     012A                  DONE_TIP:
216
217     012A                  MAPPING:
218     012A 30000D                    JNB     MAP_ENABLE,DONE_MAP ;MAP LBE BYTES IF ENABLED
219     012D EF                        MOV     A,R7
220     012E B46A09                    CJNE    A,#LBE,DONE_MAP ;CHECK FOR LBE BYTE
221     0131 200004                    JB      LSC_IS_OCU,MAP_1 ;DETERMINE MAPPING
222     0134 7FC9             MAP_0:   MOV     R7,#MAP0        ; LSC WAS CSU LOOPBACK
223     0136 8002                      SJMP    SKIPMAP
224     0138 7FB6             MAP_1:   MOV     R7,#MAP1        ; LSC WAS OCU LOOPBACK
225     013A                  SKIPMAP:
226
227     013A E500             DONE_MAP: MOV    A,EXT_OUT       ;UPDATE LATCHING RELAY CONTROL
228     013C F3                        MOVX    @R1,A           ;OUT IT GOES...
229     013D D2B1                      SETB    P3.1            ;MAKE SURE P3.3 STAYS HIGH OR IT WILL
230                                                            ;FORCE INTO LOW (TIED EXTERNALLY)
231     013F 22                        RET
232     0140                           END

Errors: None          **********
Bytes:  320           # LATCH  #
CRC:    C5D2          **********
```

What is claimed is:

1. A method for detecting M multi-bit words of a predetermined type out of N words provided in a sequence on a digital transmission line, using x counters, where $x = N-M+1$, where M is an integer greater than zero and N is an integer greater than one, said method comprising the steps of:
   a. initializing the count of all counters to zero;
   b. receiving words from said transmission line;
   c. comparing each received word to determine if it is a predetermined type word;
   d. incrementing the count of the xth counter for each consecutively-received predetermined type word;
   e. summing the count of all counters;
   f. outputting an M out of N detected signal when the sum equals M;
   g. upon detecting a word that is not a predetermined type word, setting the value of counter $x-j$ to the value of counter $x-j+1$, where j is an integer that decrements from $x-1$ to 1, then setting the value of the xth counter to zero; and
   h. Repeating steps b through g.

2. A method as described in claim 1, additionally comprising the step of resetting all counters to zero when the sum equals M.

3. A method as described in claim 2, wherein the predetermined type word is a control code word used in a telecommunications system for implementing a control function, said method additionally comprises the step of activating a means for implementing the control function in response to the M out of N detected signal.

4. A method as defined in claim 1, where each multi-bit word is one byte.

5. A method as defined in claim 4, wherein $M = 31$ and $N = ]32$.

6. A method as defined in claim 4, wherein $M = 62$ and $N = 64$.

7. A method as defined in claim 1, wherein M does not equal N.

8. A method for detecting M multi-bit words of a predetermined type out of N words provided in a sequence on a digital transmission line, using x counters, where $x = N-M+1$, where M is an integer greater than zero and N is an integer greater than one, said method comprising the steps of:
   a. initializing the count of all counters to zero;
   b. receiving words from said transmission line;
   c. comparing each received word to determine if it is a predetermined type word;
   d. incrementing the count of the xth counter for each consecutively-received predetermined type word;
   e. comparing the total count of all counters and if the total count is equal to M, setting an output associated with the digital transmission line and resetting all counters to zero;
   f. upon detecting a word that is not a predetermined type word, setting the value of counter $x-j$ to the value of counter $x-j+1$, where j is an integer that decrements from $x-1$ to 1, then setting the value of the xth counter to zero; and
   g. repeating steps b through f.

9. A method as defined in claim 8, where each multi-bit word is one byte.

10. A method as defined in claim 9, where $M = 31$ and $N = 32$.

11. A method as defined in claim 9, where $M = 32$ and $N = 64$.

12. A method for use in a data port in a telephone system that provides digital data service, wherein a request for the performance of a task requires that each of a plurality of control codes be determined to be present, wherein the presence of a particular control code requires that at least M out of N detections of the control code occur within a sequence of N incoming multi-bit words, where M is an integer greater than zero and N is an integer greater than one, wherein M and N may be different for each control code, and wherein each control code is a particular multi-bit word type; wherein the method of determining the presence of each control code uses x counters, where x equals $N-M+1$, and comprises the steps of:
   a. initializing the count of all counters to zero;
   b. receiving words from the digital data service;
   c. comparing each received word to determine if it is a predetermined multi-bit word type;
   d. incrementing the count corresponding to the control code of the xth counter for each consecutively-received predetermined multi-bit word type;
   e. comparing the total count of all counters, and if the total count is equal to M, generating a signal and resetting all counters to zero;
   f. upon detecting a word that is not a predetermined multi-bit word type, setting the value of counter $x-j$ to the value of counter $x-j+1$, where j is an integer that decrements from $x-1$ to 1, then setting the value of the xth counter to zero, and repeating steps b through f;
   g. upon generating said signal, repeating steps b through f for the next control code of said plurality of control codes; and
   h. upon determining the presence of each of the plurality of control codes, activating a means for performing said task.

13. A method as described in claim 12, wherein the following control codes are sequentially detected using the following detection criteria:
   TIP where M equals 31 and N equals 32;
   LSC where M equals 31 and N equals 32;
   LBE31 where M equals 31 and N equals 32;
   LBE62 where M equals 62 and N equals 64; and
   FEV where M equals 8 and N equals 8.

14. A method as described in claim 12, wherein the control codes must be detected in a predetermined sequence, the first of said control codes indicating that a new task is to be performed, after detecting the first control code using steps b through f, steps b through f are repeated to detect the remaining control codes sequentially, said method additionally comprising performing steps b through f for detecting the first control code immediately after performing steps b through f for detecting each subsequent control code, whereby it may be determined if the present task is to be aborted and a new task performed.

* * * * *

UNITED STATES PATENT AND TRADEMARK OFFICE
CERTIFICATE OF CORRECTION

PATENT NO. : 5,247,690
DATED : September 21, 1993
INVENTOR(S) : M. Fain

It is certified that error appears in the above-indentified patent and that said Letters Patent is hereby corrected as shown below:

On the title page, item [54] and column 1, lines 2-5, the title should read --Method for Detecting Transmitted Control Code Using M out of N Detecting Scheme for Initiating a Latching Loopback Test Procedure--.

Claim 5, line 2, please change "N = ]32" to --N = 32--.

Claim 11, line 1, please change "M = 32" to --M = 62--.

Signed and Sealed this

Twenty-ninth Day of March, 1994

Attest:

BRUCE LEHMAN

*Attesting Officer*      *Commissioner of Patents and Trademarks*